Sept. 19, 1967 KIYOMI KONDO 3,342,941
MULTI-CHANNEL CARRIER TRANSMISSION SYSTEM
Filed June 18, 1963 14 Sheets-Sheet 1

INVENTOR.
Kiyomi Kondo
BY
Attorney

INVENTOR.
Kiyomi Kondo

Sept. 19, 1967      KIYOMI KONDO      3,342,941

MULTI-CHANNEL CARRIER TRANSMISSION SYSTEM

Filed June 18, 1963      14 Sheets—Sheet 4

INVENTOR.
Kiyomi Kondo
BY Robert Burns
Attorney

Sept. 19, 1967　　　　　KIYOMI KONDO　　　　　3,342,941
MULTI-CHANNEL CARRIER TRANSMISSION SYSTEM
Filed June 18, 1963　　　　　　　　　　　　14 Sheets-Sheet 5

INVENTOR.
Kiyomi Kondo
BY Robert E. Burns
Attorney

Sept. 19, 1967  KIYOMI KONDO  3,342,941
MULTI-CHANNEL CARRIER TRANSMISSION SYSTEM
Filed June 18, 1963  14 Sheets-Sheet 7

INVENTOR.
Kiyomi Kondo
BY
Attorney

INVENTOR.
Kiyomi Kondo
BY Robert E. Burns
Attorney

Sept. 19, 1967 KIYOMI KONDO 3,342,941
MULTI-CHANNEL CARRIER TRANSMISSION SYSTEM
Filed June 18, 1963 14 Sheets—Sheet 12

INVENTOR.
Kiyomi Kondo
BY Robert E. Burns
Attorney

Sept. 19, 1967  KIYOMI KONDO  3,342,941

MULTI-CHANNEL CARRIER TRANSMISSION SYSTEM

Filed June 18, 1963  14 Sheets-Sheet 13

INVENTOR.
Kiyomi Kondo
BY Robert E. Burns
Attorney

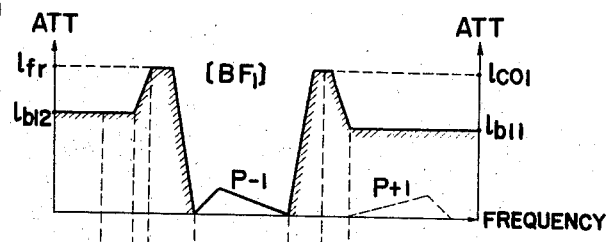
FIG. 24(A)
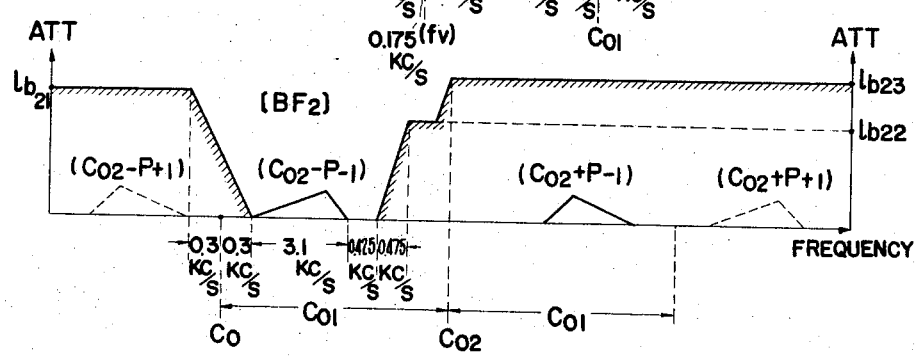
FIG. 24(B)
FIG. 25
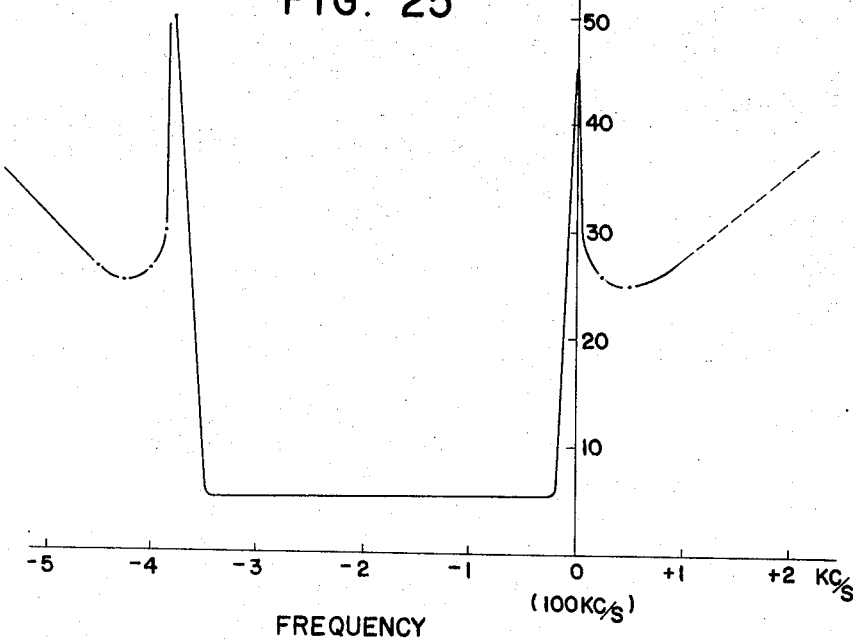

United States Patent Office 3,342,941
Patented Sept. 19, 1967

3,342,941
MULTI-CHANNEL CARRIER TRANSMISSION SYSTEM
Kiyomi Kondo, Yokohama-shi, Japan, assignor to Toyo Tsushinki Kabushiki Kaisha, Kawasaki-shi, Japan, a joint-stock company of Japan
Filed June 18, 1963, Ser. No. 288,760
Claims priority, application Japan, June 18, 1962, 37/5,293
11 Claims. (Cl. 179—15)

The present invention relates to a multi-channel carrier transmission system.

An essential object of the present invention is to provide an economical and effective multi-channel carrier transmission system in which the communication quality is not deteriorated.

In accordance with the invention, the frequencies of a plurality of input signals having voice frequency are converted and shifted into the same high frequency region of about six times or more of the maximum frequency of the transmission frequency band by a first stage of pre-modulation, thereby shifting the voice frequency input signals of all communication channels into the same high frequency band. The signals of the individual communication channels are then shifted into their respective transmission frequency bands in a second stage of modulation and thereupon transmitted to the receiving station, where they are reconverted to voice frequency signals in reverse manner. The novel system in accordance with the invention is highly advantageous in that the filters can be greatly simplified and the cost of the system is materially reduced.

The above objects and the other objects of the present invention have been attained by the system as described below in connection with the drawings, in which the same or equivalent parts are designated by the same numerals and letters, and in which:

FIGS. 1 and 2 explain the ordinary multi-channel carrier transmission system now commonly used, in which telephone signals are pre-modulated to 12-channel groups in the frequency band of between 60 kc./s. and 108 kc./s., and then they are shifted to frequency band of $f_1-f_2$ (8–56 kc./s.) by group modulation system.

FIG. 3 explains the cross-modulation products which are produced when a basic component F (signal) having a frequency band of $\Delta f(f_1-f_2)$ is applied to a known modulator or other non-linear system.

FIG. 4 indicates an embodiment of the characteristic feature of the transmitting and receiving band-pass filters, SB12 and RB12, shown in FIG. 1 (the 12th channel 60–64 kc./.s, though not indicated in FIG. 1), the frequency 64 kc./s. in FIG. 4 being a carrier frequency.

FIG. 6 shows only two channels of the transmitting side, the receiving side being omitted because it has only reversal arrangement of the transmitting side as is well known.

Figure 7:
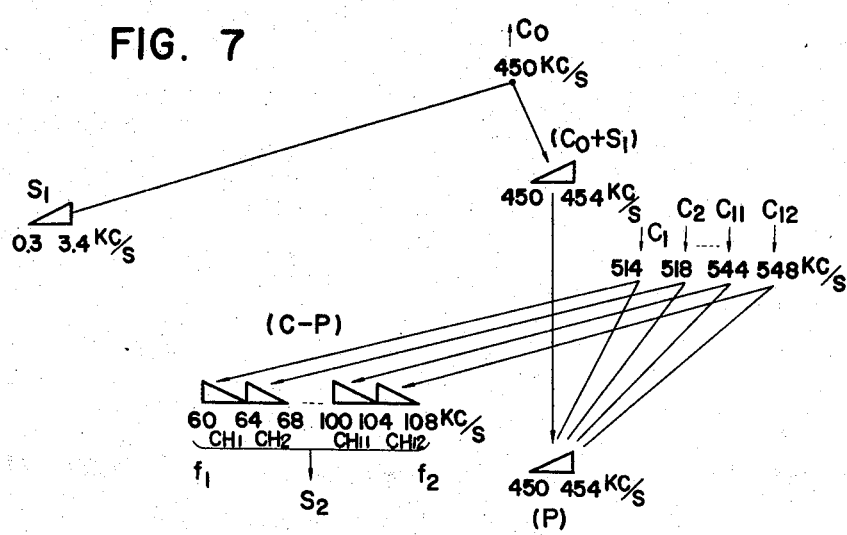
FIG. 7 is a system diagram showing frequency transition of modulated signal for explaining the principle of this invention, where the frequency of pre-modulated signal P is selected as 450 kc./s., or about 4 times as much as the maximum frequency band.
Figure 9A:
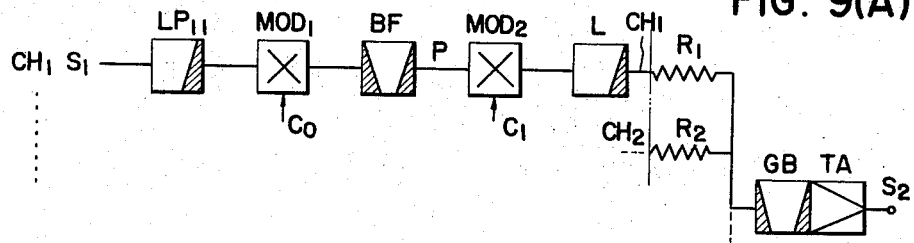
Figure 8:
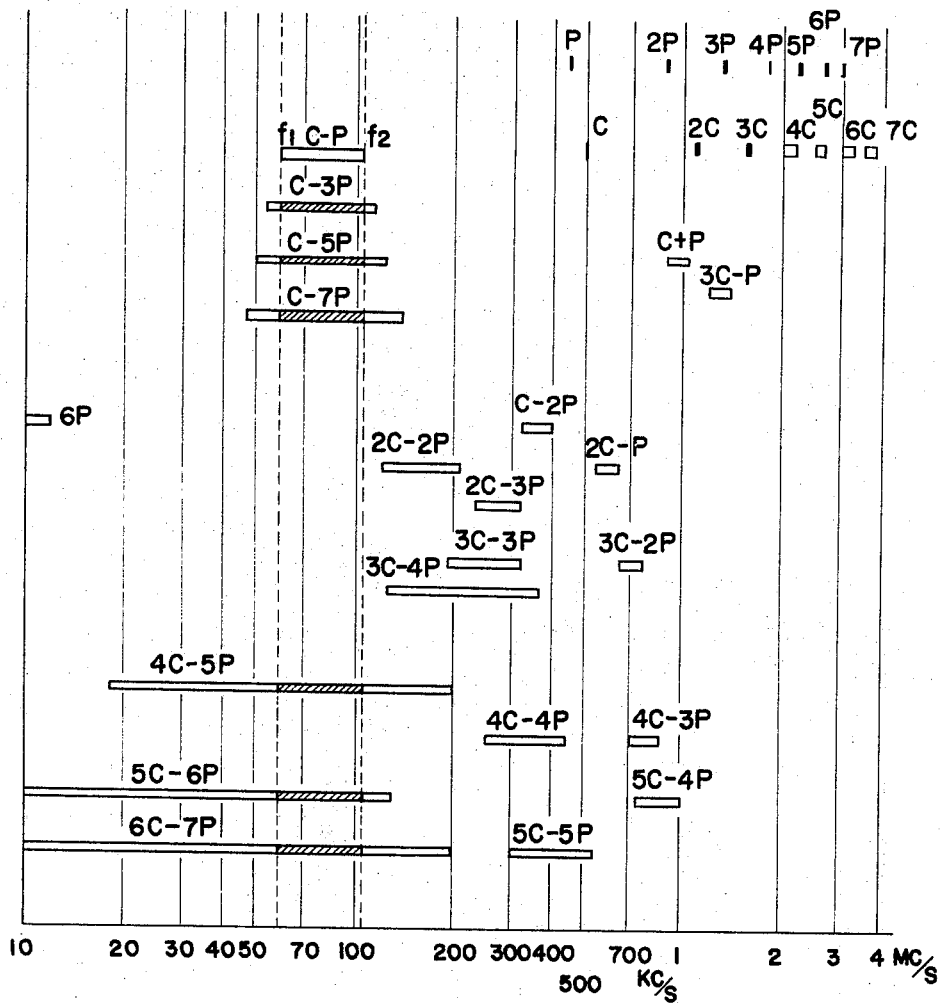

FIG. 8 denotes the distribution of a part of modulation product obtained by combining the outputs from the channel modulators, shown in FIG. 9(a), and consisted in accordance with the system in FIG. 7.

FIG. 9(a) is a block diagram of the system using frequency shifting on the transmission side shown in FIG. 7.

Figure 9B:
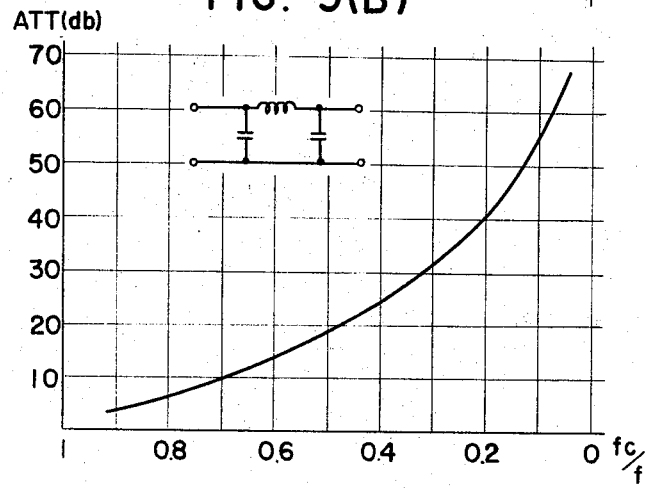

FIG. 9(b) is a chart representing the relation between the attenuation loss and the ratio $f_c/f$, where $f_c$ is the cut-off frequency of one section of a constant K-type low-pass filter and $f$ is the frequency higher than $f_c$. From this diagram, it is understood that if $f$ is 5 to 6 times as high as $f_c$, or, $f_c/f=0.2$, the attenuation loss is greater than 40 db.

Figure 9C:
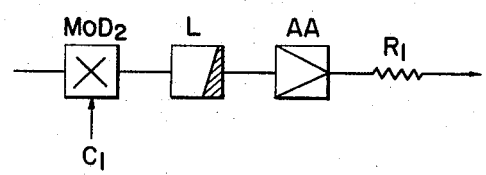

FIG. 9(c) indicates the case of using an amplifier in order to obstruct backward currents coming through the combining net-work which combines or separates channels.

Figure 10:
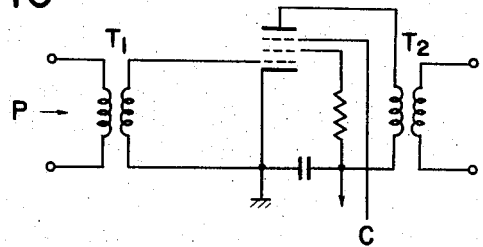

FIG. 10 is an example of a conventional unbalance modulator which has an unbalance circuit with respect to the input signal P and the carrier frequency C, its current leaking out of the output side.

In this case, the input signal P is applied to the first grid of the valve through an input transformer, and the carrier frequency C to the third grid, and its output signal is taken out through a transformer.

Figure 11:
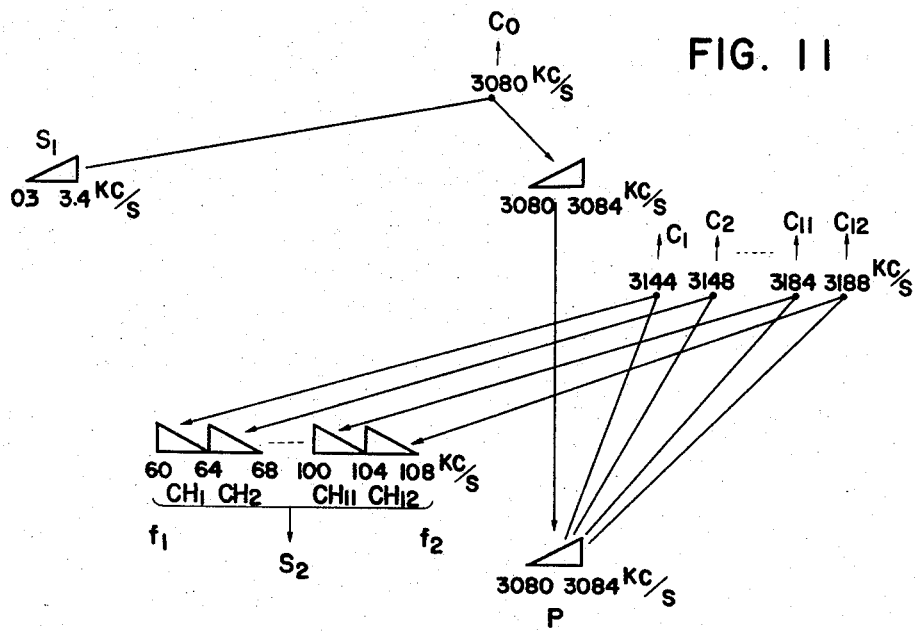
Figure 12:
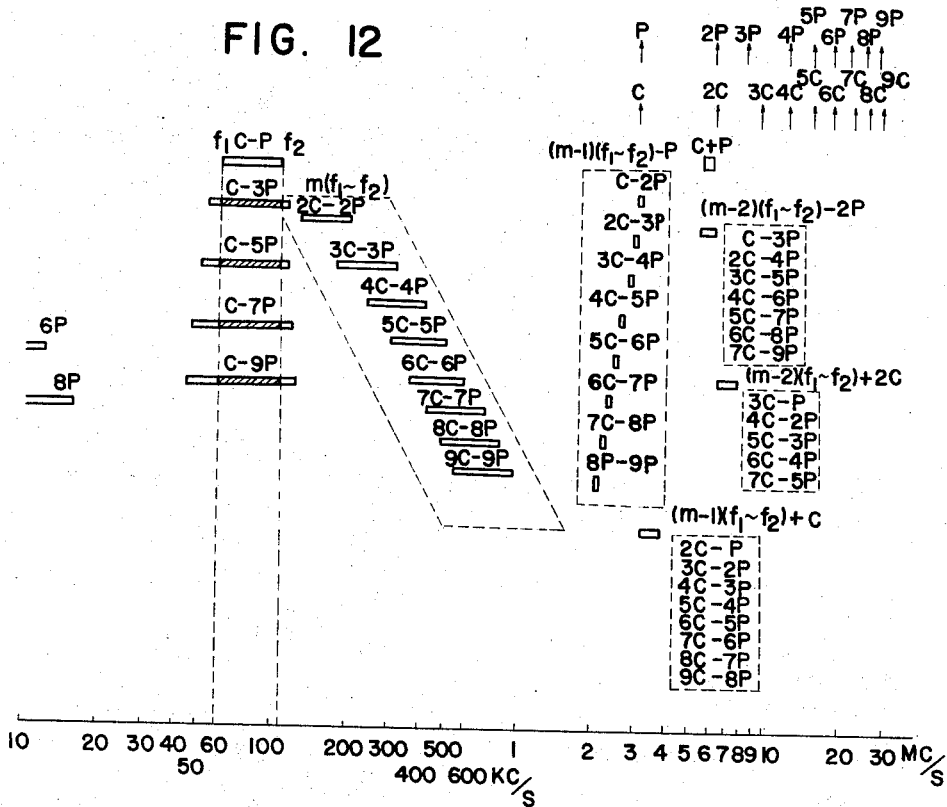

FIGS. 11 and 12 explain the case in which one of the most characteristic features of this invention is fully displayed. Assuming that the pre-modulated signal P is 3,080 kc./s. and its transmission frequency band has 12 channels ranging from 60 kc./s. to 108 kc./s., FIG. 11 shows the frequency conversion and FIG. 12 indicates the distribution of modulation product.

Figure 13:
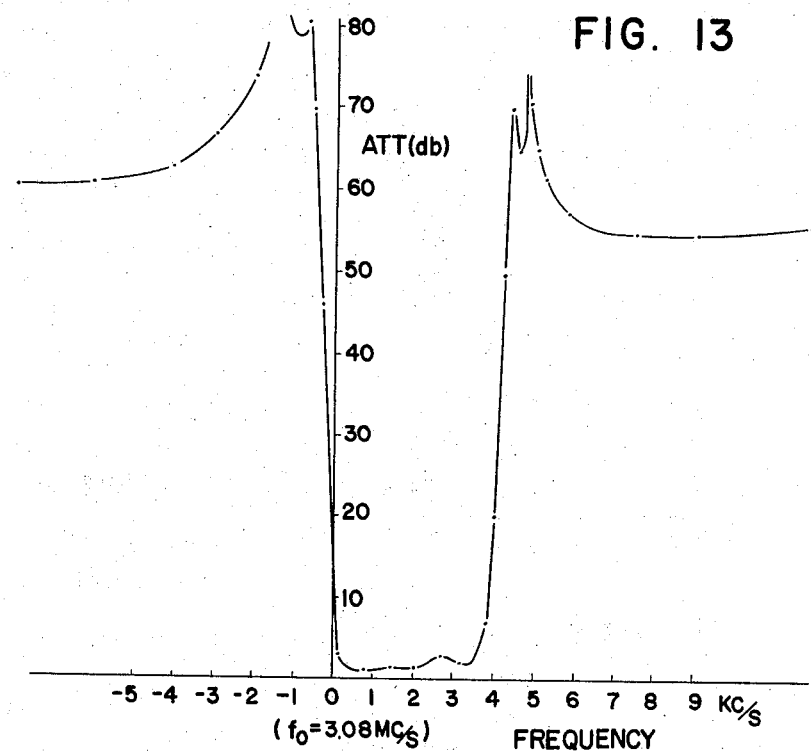

FIG. 13 is an example of a crystal filter for selecting the signal P which is pre-modulated to 3,080 kc./s.

Figure 14A:
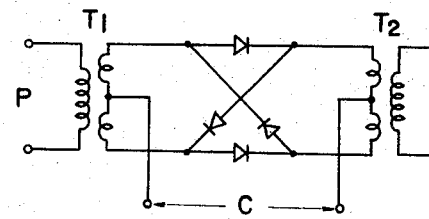

FIGS. 14(a and b) indicate a common type ring modulator circuit using two transformers.

FIGS. 15(a–d) are the explantion of the equivalent circuit of a transformer and introduction of the constant of the said equivalent circuit as the elements of low-pass or band-pass filter at the time of the transformer designing.

Figure 16:
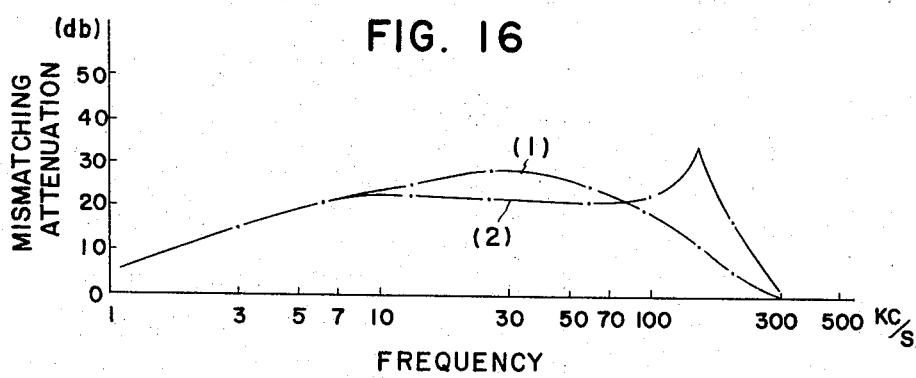
Figure 15A:
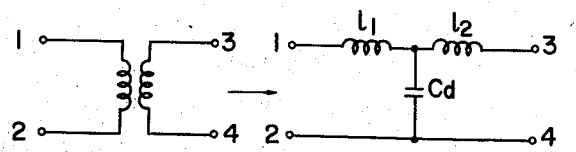
Figure 15B:
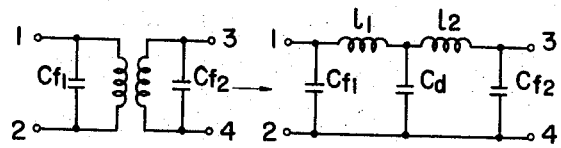
Figure 15C:
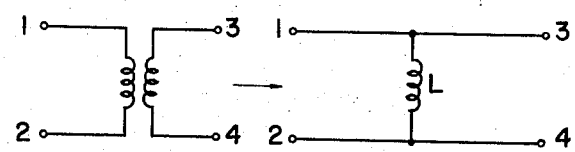

FIG. 16 represents the return loss characteristic curve 1 of the transformer having the equivalent circuit of FIG. 15(a) in the case of 75 ohms of the pass-band design impedance, and the same characteristic curve $a$ of the transformer having the equivalent circuit of FIG. 15(b) into which $Cf_1$ and $Cf_2$ are connected, said both curves being drawn on actual measurements.

Figure 17:
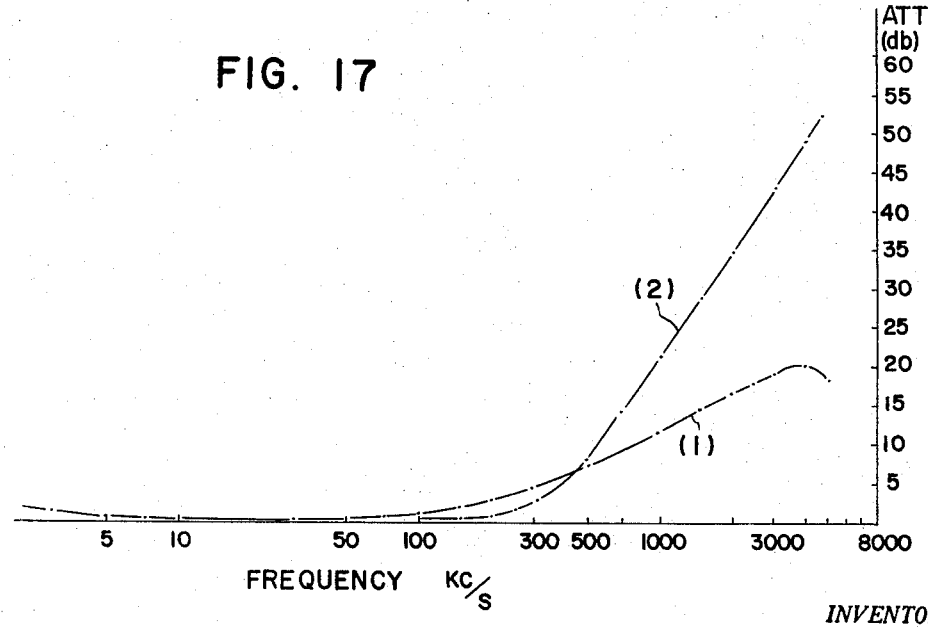

FIG. 17 shows the measured values of attenuation-frequency characteristics in the high frequency attenuation bend, which correspond to the curves 1 and 2, respectively, of FIG. 16.

Figure 18:
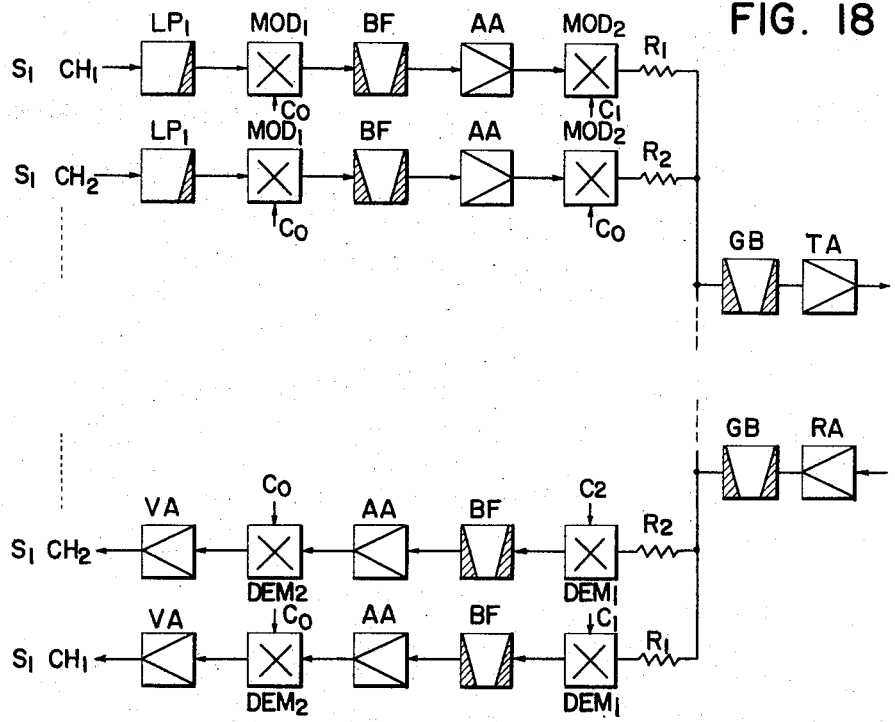

FIG. 18 is a block diagram of the circuit such as shown in FIG. 11 in the case in which the low-pass filter to be inserted between the channel modulator or demodulator and the combining circuit is eliminated by using the transformer such as shown and described in connection with FIGS. 15, 16 and 17.

Figure 19:
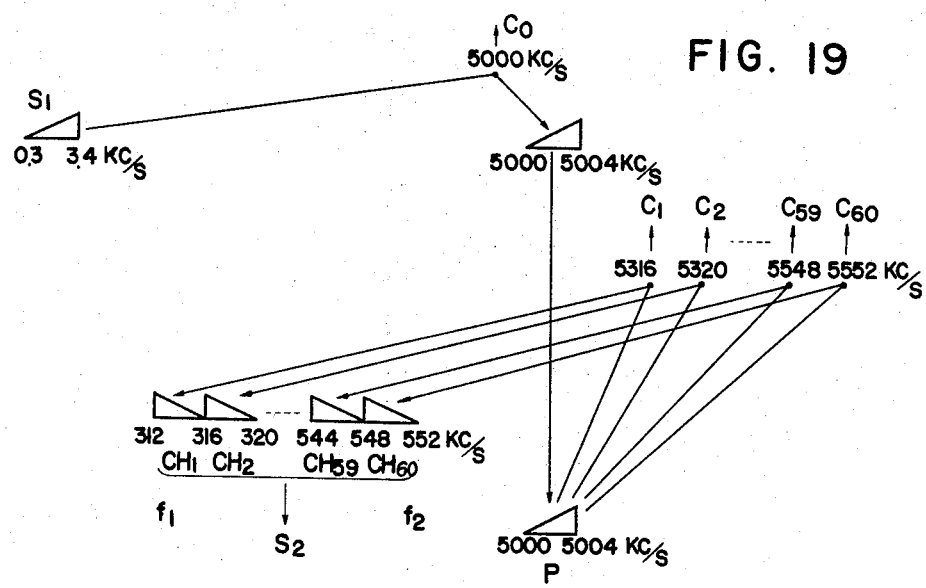

FIG. 19 is the frequency conversion diagram, when the transmission frequency band is set at 312–552 kc./s. including 60 channels and the frequency of the pre-modulated signal P is selected at 5,000 kc./s.

Figure 20:
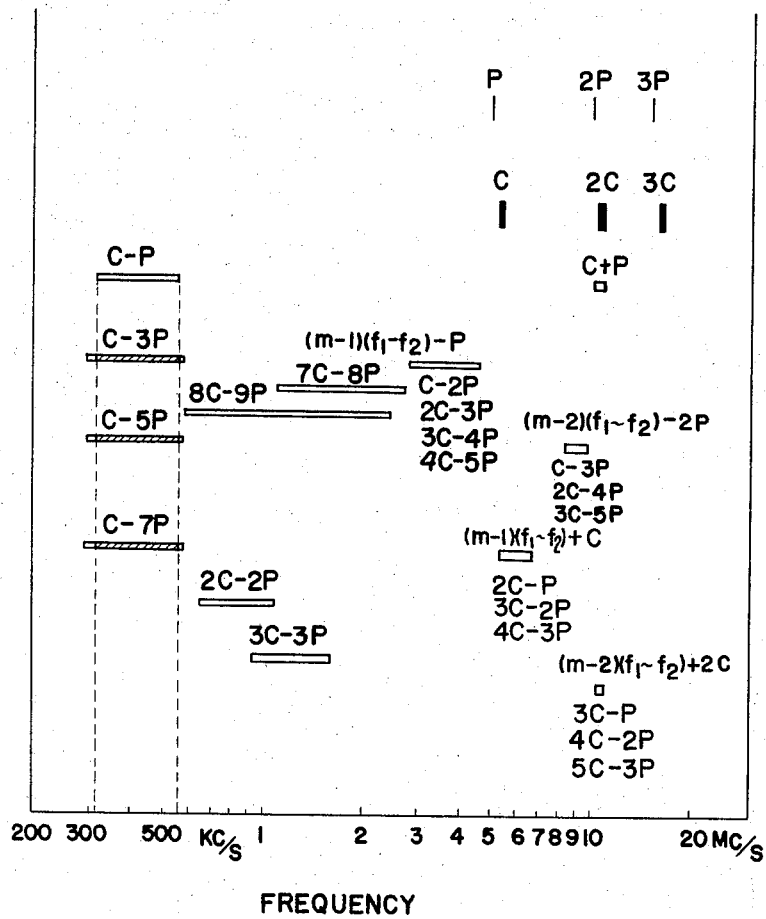

FIG. 20 indicates a part of modulation products in the FIG. 19.

Figure 15D:
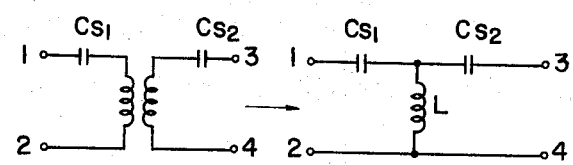
Figure 21:
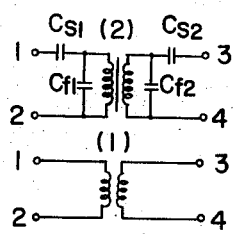

FIG. 21 is an example of actual measurement of a transformer characteristic, wherein curve 1 is the characteristic of the transformer itself and curve 2 is the characteristic of the transformer circuit designed to have a band pass filter characteristic, the equivalent circuit being the same as FIG. 15(d) in low frequency pass band of 60–552 kc./s. and the same as FIG. 15(b) in high frequency band.

Figure 22:
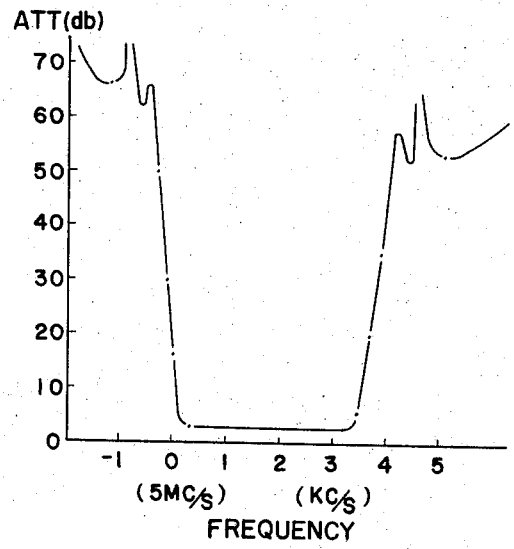

FIG. 22 shows an embodiment of the crystal filter manufactured to be used in this invention, which selects the upper side band of the carrier frequency of 5 mc./s.

Figure 23:
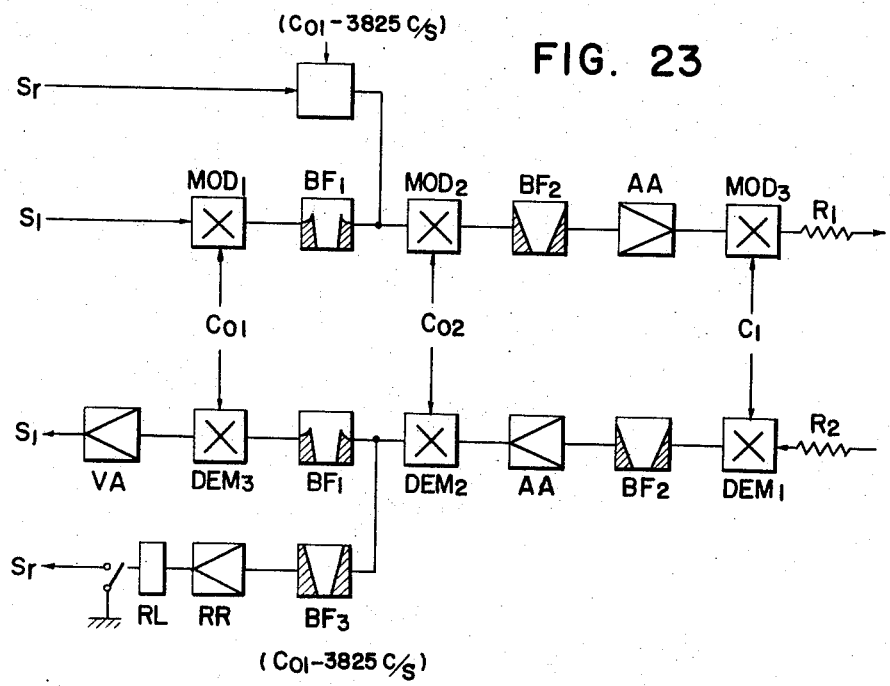

FIG. 23 shows the block diagram of the system to be used when it is technically difficult or not economical to convert voice frequency signals to the desired premodulated frequency P by one modulation stage, and therefore the number of stages of pre-modulation is increased and the signals are successively modulated, in which two stages pre-modulation is shown in the figure and an instance of transmission of call signal to be used in a telephone circuit is also shown.

FIG. 24 shows the attenuation characteristics to be given to each band pass filter in the plural and successive pre-modulation system of this invention.

FIG. 25 shows an instance of the attenuation characteristics of the first band pass filter, where the first pre-modulation is done by 100 kc./s. frequency.

Figure 26:
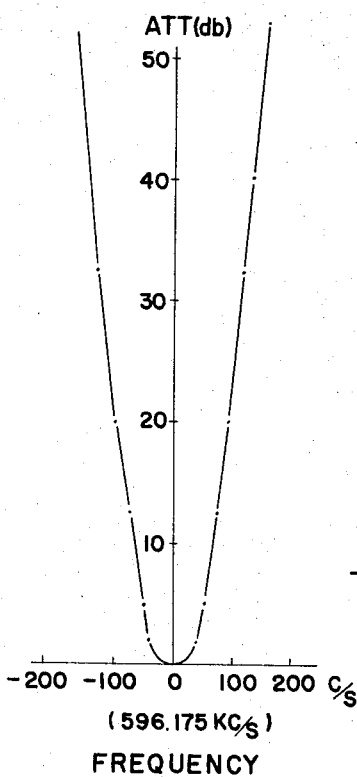

FIG. 26 shows an instance of the characteristic of the filter BF3 in FIG. 23 to select the call signal frequency (Co 1–3825 c./s.)=596.175 kc./s., on the assumption that 600 kc./s. is chosen for the first pre-modulation (frequency) and its lower side band is selected by the first band-pass filter.

Figure 27:
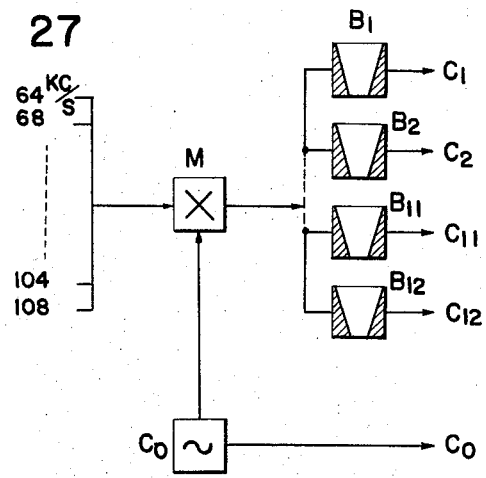

FIG. 27 explains the method, in this invention, to make the frequency deviations of the carrier oscillators for pre-modulation and channel modulation independent of each of the transmission components.

Figure 28:
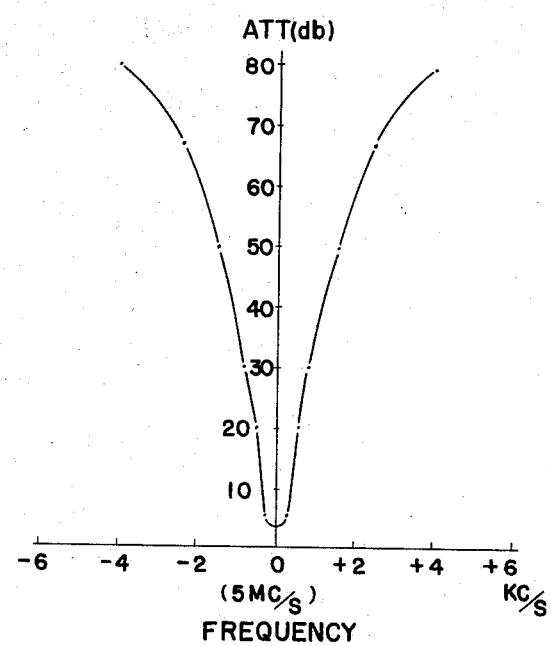

FIG. 28 shows an instance wherein the frequency of the band-pass filter for selecting the carrier frequency for channel modulation, is taken as 5 mc./s.

An amplitude modulation system is substantially a system, in which voice frequency signals are applied, with a carrier frequency, to a non-linear system, and then from many modulation products produced there, one component to be transmitted is selected by the bandpass filters. Consequently, in the single side band multi-channel carrier transmission system, there exist strong unwanted side band and other components of modulation products near the component to be transmitted, so that the frequency characteristics in both the pass-bands and the attenuation bands required for the above mentioned band pass filters naturally becomes severe to assure good qualities in transmission.

Yet, these band pass filters necessitate as many different kinds as the number of channels. Moreover, since these filters are commonly connected to combine or separate the signals for multi-channel transmission or reception, the above-mentioned severe characteristics of the filters must not be deteriorated by these common connections.

For the above reasons, the multi-carrier transmission system requires considerable expenses to design and manufacture the band-pass filters.

This invention, taking this point into consideration, provides an economical multi-channel carrier transmission system.

Figure 1:
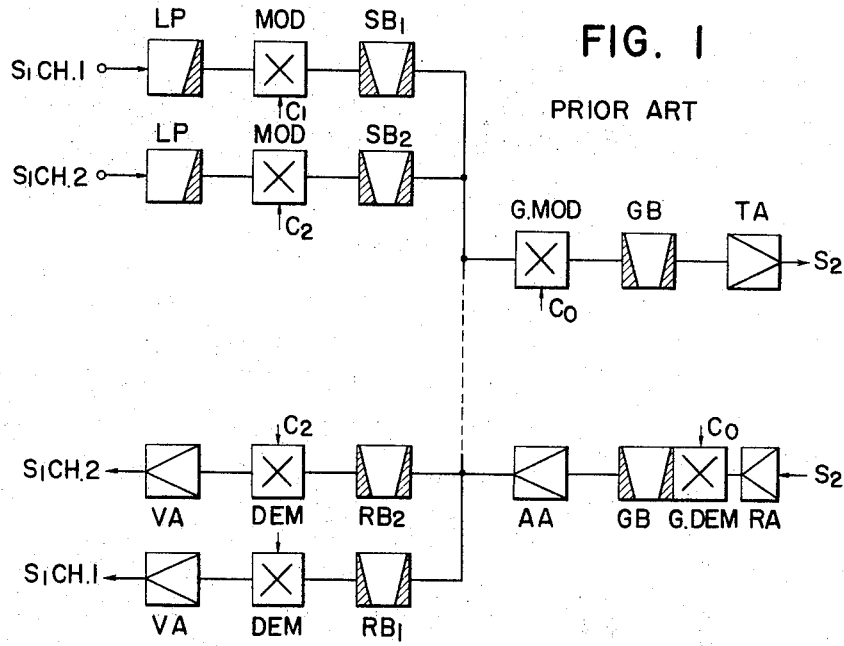
Figure 2:
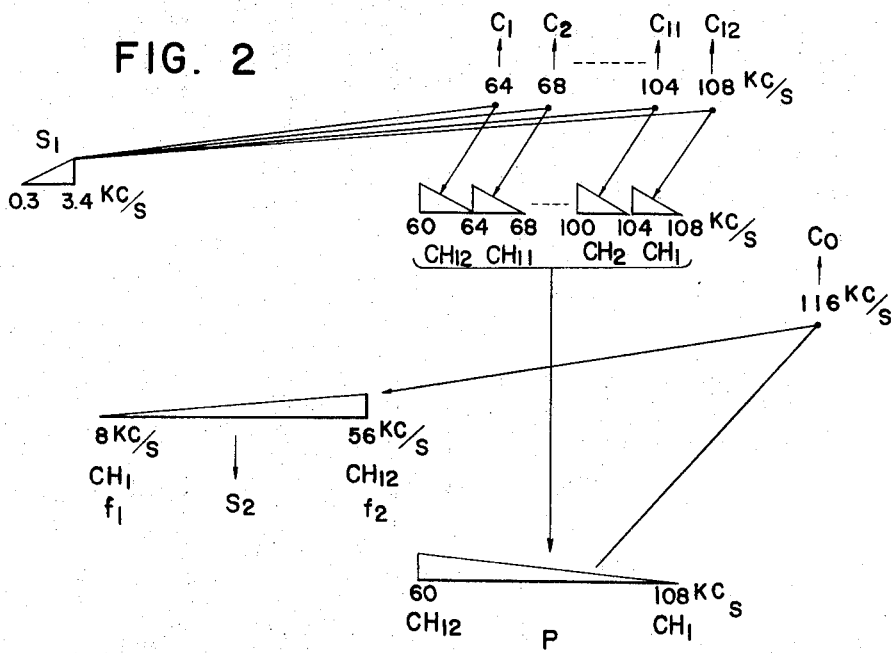

The block diagram of conventional multi-channel carrier transmission system, for instance, the system used as a long distance telephone circuit utilizing non-loaded cables or co-axial cables, is shown in FIG. 1. The voice frequency signal S applied to the transmitting side is transmitted to the low-pass filter L.P. of the system, where its components above 3,400 c./s. are suppressed. The output signal is modulated at the modulator MOD which is applied with a carrier frequency C. In the case of a 12-channel system, for instance, the values of C are: $C_1 = 64$ kc./s., $C_2 = 68$ kc./s. ... $C_{11} = 104$ kc./s. and $C_{12} = 108$ kc./s., as shown in FIG. 2. Out of the modulation products thus produced, the lower side band components are selected by the bandpass filters SB1, SB2 .... As these 12 output signals are commonly connected, all the lower side band components are combined and are applied to the next group modulator. Assuming that the frequency band of the signals to be transmitted is 8–56 kc./s. as shown in FIG. 2, the group modulation carrier frequency Co is 116 kc.s. The group band-pass filter GB transmits the component of 8–56 kc./s. and eliminates other components. The transmitting amplifier TA amplifies the signal S2 to the required transmitting level and at the same time it is required to have the least non-linear distortions in its characteristics, because the distortions cause a cross modulation effect and deteriorate the communication qualities.

The cross modulation effect is explained in connection with FIG. 3.

A fundamental signal F having the frequency band $(f_1 - f_2 = f)$ is applied to a non-linear system ($f_1$ = minimum value, $f_2$ maximum value). The secondary order distortion components among the modulation products produced from it are a summation component with the frequency band of $2f_1 - 2f_2$ and a difference component with the frequency band of $0 - f$. In the third order distortion components, the summation component spreads around the frequency band $3f_1 - 3f_2$ and the summation and the difference component having $(f_1 - \Delta f) - (f_2 + \Delta f)$ distributes around the fundamental signal frequency band.

Figure 3:
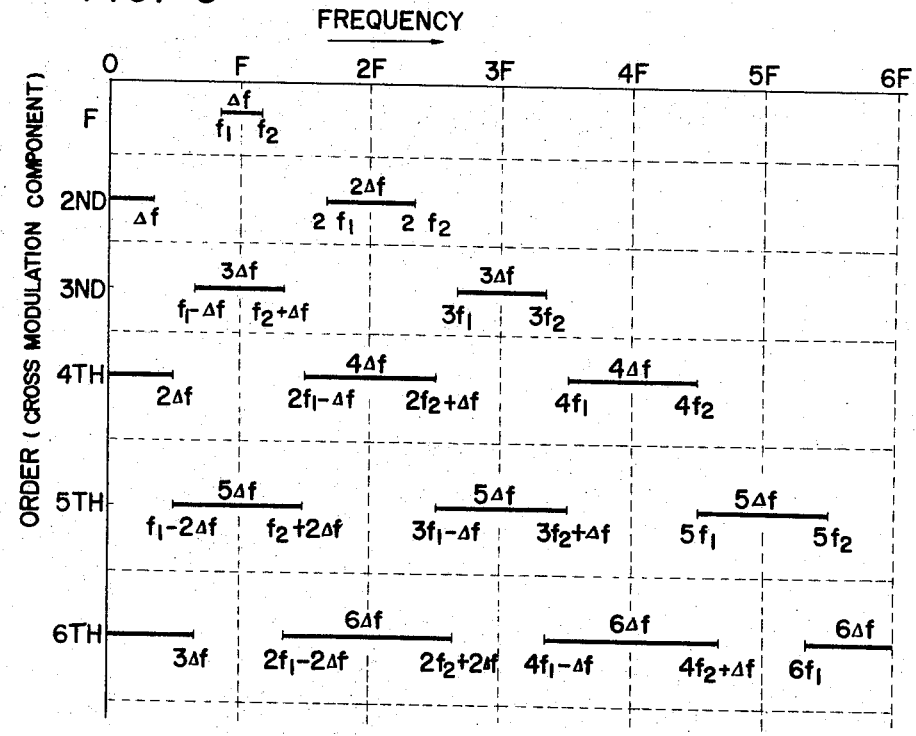

The 4th order distortion components and above are as shown in FIG. 3: a part of the odd summation and difference order distortion components always exists in the fundamental signal frequency band. Also, as seen from FIG. 3, according to the band width $\Delta f$ and the values of $f_1$ and $f_2$, the even order distortion components may mix in the fundamental signal frequency band.

Such cross modulation products mixing in the fundamental signal frequency band cannot be eliminated by any filter with the result that they increase noise and deteriorate the communication quality.

In the ordinary multi-channel carrier transmission system, the frequency band 312–552 kc./s. is used to compose a 60-channel group. It is the well-known method that five sets of the 12-channel groups of 60–108 kc./s. in FIG. 2 are allocated, for this purpose, in the above-mentioned frequency band of 312–552 kc./s. by group modulations.

In the receiving side, the reverse operation of the above-mentioned transmitting side are carried out as shown in FIG. 1. The transmitted signals (12 channels, 8–56 kc/s. frequency band) are amplified by receiving amplifier (RA) having as low distortion characteristic as the transmitting amplifier (TA).

The signals demodulated by the group demodulator (G.DEM) are in 60–108 kc./s. frequency band and are selected by the group band-pass filter GB which eliminates the undesirable side band components, leakage components of the carrier frequency and leakage components of the input signal (8–56 kc./s.). After the signals of 60–108 kc./s. are amplified by the amplifier (AA), they are separated to each channel by the receiving band-pass filters RB1, RB2 .... Then they are demodulated to voice frequencies by the demodulators (DEM), and transmitted to the receiving side through the amplifiers VA.

In the system as shown in FIG. 1, considerable effort is required to design and manufacture the group-modulators, group-demodulators and the channel filters having different frequency characteristics.

In an ordinary long distance cable communication system and the like, the modulation distortion power allotted to the terminal equipments is 60 PW (peak-watts) in 12-channel group modulation and 180 PW in 60-channel group modulation in comparison with the channel modulation of 30 PW or so. This is due to the fact that the distorting modulation product components for one channel increase according as the frequency band of the input signals (P) to the group modulator widens, mainly because there are the odd order distortion modulation produces $C_0 \pm 3p$, $C_0 \pm 5p$ etc. in the transmitting frequency band.

Therefore, designing and maintenance of the group modulator must be done most carefully.

Especially, the transmitting band-pass filters in FIG. 1 must suppress the unwanted side band sufficiently and pass the necessary single side band so as to have the minimum possible attenuation distortion.

And the receiving band-pass filters must eliminate the call signal components in the neighboring channels. Also as the filters are connected commonly to combine or separate signals, they must be designed considering their mutual effects.

Figure 4:
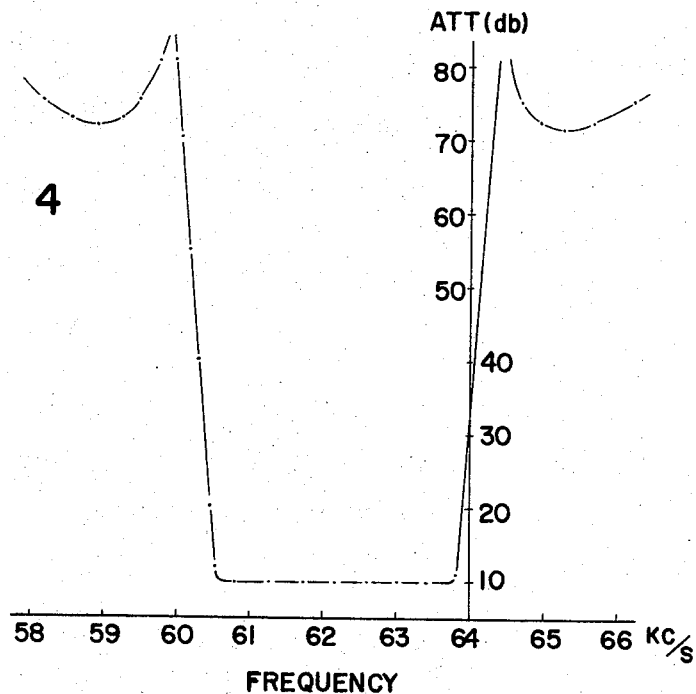

So the filters are generally required to have sharp cut-off attenuation frequency characteristic as the example shown in FIG. 4. In order to satisfy this rigid characteristics, the filter shown in FIG. 4, is mainly composed of 6 different kinds of quartz crystal elements of about 44 mm. long and 5 mm. wide. Consequently, in the 12-channel system, 72 (6×12) kinds of quartz crystal elements are necessary.

The fact that there are many kinds of elements which construct the band pass filters of severe characteristics requires a great deal of labor to manufacture these elements as the number of channel increases. And many apparatuses and complicated technique are required to adjust and test the filters assembled from these elements. Therefore, they become much expensive. It is desirable that the kind of the filter is limited and the limited kind of the filter can be mass-produced. This will contribute to economical production of the filters.

It is desirable from the technical point of view that the required number of the filters having the above mentioned severe characteristics are allocated in the transmission frequency band. For instance, if it is possible to allocate 60 channels in the frequency band of 312–552 kc./s. by one modulation stage, it will be the most desirable 60-channel system, because this system does not require the group modulation of 12 channels in 60–108 kc./s. frequency band, which causes many distortion components.

One of the reasons of not using this system consists in the technical difficulty to allocate 60 filters in 312–522 kc./s. band in the continuous state of their pass-bands. In the single side band communication system of the short wave radio, also, it is difficult to convert voice frequency signals to the short wave radio frequency band by one modulation stage. Therefore signals are first modulated to the frequency of 455 kc./s. or several mc./s., then, to the next frequency and further; thus the signals are successively modulated to the short band frequency. This is mainly ascribed to the difficulty of getting the channel modulation band-pass filters that satisfy the required standard in the transmission frequency band.

Accordingly, the voice frequency signals are converted by pre-modulation to the frequency band, the frequency of which enables the filters to be easily manufactured; then through the subsequent one or more modulation stages, to the transmission frequency band. This pre-modulation method has the advantage of decreasing the kinds of band-pass filters in multi-channel communication system. For instance, 60 kinds of filters are necessary to allocate 60 channels in the frequency bands of 12–552 kc./s. by one stage modulation, but if 12 channels of voice frequency signals are allocated by pre-modulation in the frequency band of 60–108 kc./s., and five groups of these 12 channels are combined to 60 channels, the necessary kind of the filters will be only 12 for channels and 5 for groups. This is a great economical advantage. Another advantage of the pre-modulation method is that it facilitates manufacturing of the band-pass filters, especially in the single side band system. As the voice frequency signal has the frequency band of 0.3–3.4 kc./s., the unwanted side band exists 600 cycle apart there-from. If the signals are pre-modulated to the frequency where the band-pass filters can have the sufficient attenuation characteristic at the frequency 600 cycles apart from the cut-off frequency, the unwanted side band components at the next modulation stage will be in the frequency region about two times of the pre-modulated signals frequency apart. Accordingly it will become very easy and simple to design the filters for suppressing the said unwanted side band components. The pre-modulation system is concretely explained in connection with FIGS. 5 and 6. In FIG. 6, only the transmitting side is shown, neglecting the receiving side, because the receiving side is the reverse state of the transmission side. 12 channels are allocated in the frequency band of $f_1 - f_2$ (60–108 kc./s.) with an interval of 4 kc./s. between each channel. In this system (FIG. 5), voice frequency signal is not converted to the transmission frequency band by one modulation stage as in the case of FIG. 2, but it is applied first to the pre-modulator MOD, as shown in FIG. 6. In MOD, the signal is modulated by the carrier frequency $C_0$ 12 kc./s., and the lower side band $P = C_0 - S_1$ of the modulated signal is selected by band-pass filter BF, to eliminate the unwanted side band $C+S$. In the frequency of this degree, the band-pass filter BF of the rigid standard can be easily manufactured with magnetic core inductors and capacitors as its elements to the 0.3–3.4 kc./s. frequency band as the voice frequency signal $S_1$.

When the voice frequency signal of all the channels are pre-modulated, frequencies of the signals in all channels are uniformly shifted and brought into the same pre-modulated frequency band P(8.6–11.7 kc./s.).

These pre-modulated signals P are further modulated by the next channel modulators $MOD_2$ which are applied with the carrier frequencies of $C_1$ 52 kc./s. for the first channel, $C_2$ 56 kc./s. for the second channel . . . , $C_{12}$ 96 kc./s. for the 12th channel, respectively. Therefore, when the out-put upper side band ($C_1 - P_1$ 60–64 kc./s., $C_2 - P_2$ 64–68 kc./s. . . . , $C_{12} - P_{12}$ 104–108 kc./s.) are selected respectively by the band-pass filters B of the output side of $MOD_2$, and combined, the 12 channels can be allocated in the frequency band $f_1 - f_2 = 60$–108 kc./s.

The unwanted lower side bands of the channel modulator $MOD_2$, in this case, are $C_1 - P_1$ 40–44 kc./s., $C_2 - P_2$ 44–48 kc./s. . . . , $C_6 - P_6$ 60–64 kc./s. . . . , $C_{12} - P_{12}$ 80–88 kc./s., respectively. As the unwanted lower side bands are apart from their corresponding upper side bands by 16 kc./s. (two times as high as the lowest frequency of $P = 8$ kc./s.), the band-pass filters B can be designed and manufactured very easily and simply, if only attention is directed to eliminate the unwanted lower side band. If the distortion modulation products produced at the pre-modulator $MOD_1$ are considered up to the third components, as the components $C_0 + 3s$ has the frequency band of 3 times as wider as the input signal frequency band, these components disturb the neighboring channels. (The $C_0 + 3s$, components produced within its own frequency band is inevitable and they give noise to its own channel only and do not disturb other channels.) However, the said disturbance is eliminated by the band-pass filter BF together with other unwanted modulation products. Therefore, the disturbance of the distortion modulation products of the pre-modulator to other channels even in the case of multi-carrier transmission is not a question to be considered. However, the characteristics of the band-pass filters B at the output of the modulators $MOD_2$ must be designed considering the following points. Among the modulation products produced at the channel modulators $MOD_2$, the components of $2C \pm P$, namely $2C_1 - P_1$, $2C_2 - P_2$ . . . , $2C_{12} - P_{12}$, are transmitted backwardly through the band-pass filters B with attenuation and through the coupling circuit ($R_1$ $R_2$ . . . ) for combining each channel in FIG. 6 to the other channel-modulator.

There, these $2C \pm P$ components are modulated again by the carrier frequency C of the channel modulator, thus producing new components $(2C \pm P) - C$. For instance, in FIG. 5, $(2C_1 \pm P_1) = 112$–116 kc./s., $2C_2 \pm P_2 = 120$–124 kc./s., $2C_3 \pm P_3 = 128$–132 kc./s. . . . , $2C_{12} \pm P_{12} = 200$–204 kc./s. Accordingly, assuming that the modulation products component $2C_3 + P_3$ of the third channel modulator is backwardly transmitted to the first channel modulator, the difference modulation product component $(2C_3 + P_3) - C_1$ (128~132 kc./s.)−52 kc./s.=76~80 kc./s. is produced, which is the transmission band corresponding to that of the fifth channel. Also $$2C_1-P_1=92\sim96 \text{ kc./s.}$$
$$2C_2-P_2=100\sim104 \text{ kc./s.}$$
$$2C_3-P_3=108\sim112 \text{ kc./s.}$$
$$2C_4-P_4=116\sim120 \text{ kc./s.} \ldots$$
$$2C_{12}-P_{12}=180\sim184 \text{ kc./s.}$$

Assuming that the component $2C_4-P_4$ of the fourth channel modulator, a component of $$(2C_4-P_4)-C_1=(116\sim120 \text{ kc./s.})-52 \text{ kc./s.}=64\sim68$$

kc./s. is produced, which lies in the transmission frequency band corresponding to that of the second channel. If such components $(2C\pm P)-C$ are transmitted, they will apparently produce cross-talk effect.

Next if the unwanted side band signal $C-P$ produced at the channel modulator is transmitted backwards through a coupling circuit to the other channel modulator and further modulated there by the doubled harmonics $2C$ of its carrier frequency, the modulation products will be in the transmission frequency band. For instance, if the unwanted side band component $C_1-P_1=40\sim44$ kc/s. of the first channel is transmitted backwards to the sixth channel modulator and modulated by its doubled carrier frequency $2C_6=144$ kc./s., the modulation products component $$2C_6-(C_1-P_1)=144 \text{ kc./s.}-(40\sim44 \text{ kc./s})=104\sim100$$

kc./s. is produced, which lies in the transmission frequency band of the eleventh channel and produces crosstalk effect.

And if the input signal PX leaks at the Xth channel modulator and is transmitted backwards through a coupling circuit to the Yth channel, the signal will be modulated by its carrier frequency $C_Y$ and the component $C_y+P_x$ will be produced. This component becomes crosstalk from the Xth channel to the Yth channel.

Similarly, if the carrier frequency $C_x$ of the Xth channel modulator leaks and is transmitted backwards to the Yth channel modulator, the component $C_x+P_y$ will possibly be produced, which will become crosstalk from the Yth channel to the Xth channel.

Backward transmission of the distortion modulation products component $(3C\pm P)$ of the channel modulator to other channel will also cause crosstalk effect. For instance, in FIG. 5 there exists at the output side of the fifth channel modulator a considerably powerful component of $(3C_5\pm P_5)$, especially in a ring modulator circuit. When this component is transmitted backwards to the fourth channel modulator, it will be modulated in the said modulator by the second harmonics of the carrier frequency $2C_4$ and the component $(3C_5\pm P_5)-2C_4=204$ kc./s.$\pm P_5-128$ kc./s.$=76$ kc./s.$\pm P_5$ will be produced. This component, when transmitted, will cause crosstalk from the fifth channel to the second and seventh channels.

The foregoing are examples of distortion components produced by primary backward transmission. But, there are distortion components produced secondarily by backward transmission, the level of which being considerably lower than that of the above primary components. For instance, in FIG. 5 the transmission frequency band of the third channel is $C_3+P_3$, and if this signal is transmitted backwards to the fourth channel, the component $(C_3+P_3)+C_4$ will be produced. If this component is again transmitted backwards to the first channel, the component $\{(C_3+P_3)+C_4\}-C_1$ will be produced, that is $\{(60 \text{ kc./s.}+P_3)+64 \text{ kc./s.}\}-52 \text{ kc./s.}=72 \text{ kc./s.}+P_3$.

A 72 kc./s. has apparently the same frequency as the carrier frequency $C_6$ of the sixth channel modulator, this component will cause crosstalk from the third channel to the sixth channel.

The way of decreasing this crosstalk is either to eliminate the backward flow of such transmission component as $C_3+P_3$ to the other channels by using an amplifier AA in FIG. 9(c), or to eliminate the component $(C_3+P_3)+C_4$ produced by the initial backward flow by the fourth channel band pass filter, thus making impossible the existence of the second backward flow. However, in the case of FIG. 5, as the unwanted side band component $C-P$ still remains within the transmission frequency band even after the backward transmission having been eliminated by the amplifier AA, the band pass filters B such as shown in FIG. 6 is necessary.

Figure 5:
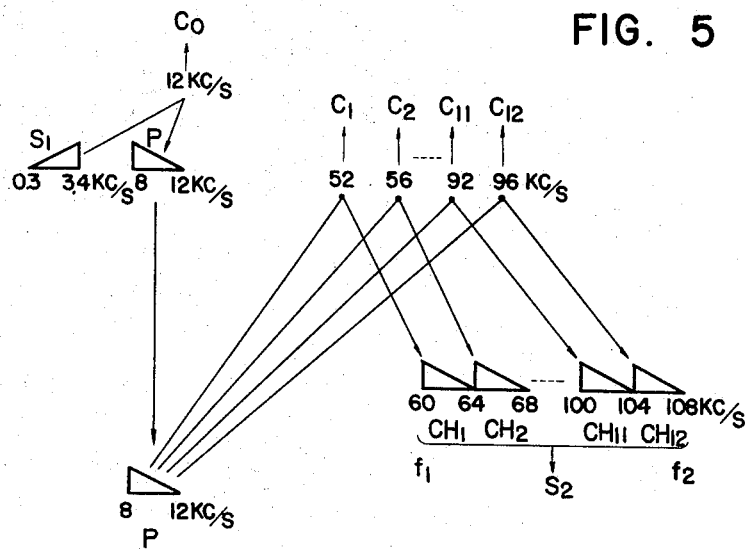
FIGS. 5 and 6 are embodiments of a 12-channel group forming a known pre-modulation system in which the pre-modulation carrier frequency is taken for 12 kc./s., and the produced lower side band P is converted to the frequency band of 60–108 kc./s. by channel modulation.
Figure 6:
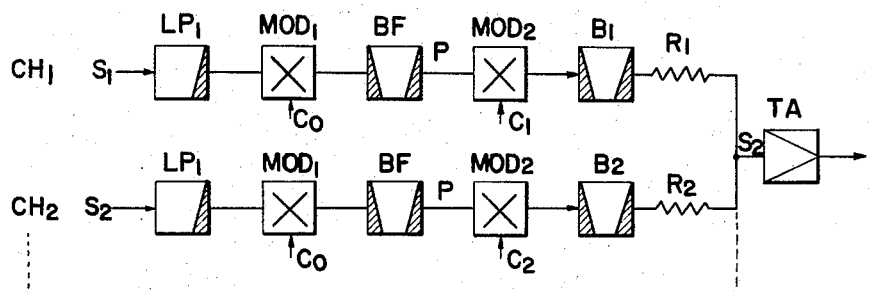

As has been explained in connection with many examples in the case that a premodulated signal P is selected in the frequency band lower than the transmission frequency band $f_1-f_2$, as shown in FIGS. 5 and 6, and then is allocated in the transmission frequency band by the channel modulation, the kind of the band pass filters B becomes less than the number of channels with the result that designing thereof becomes easier. However, on the contrary, number of the filter to be manufactured increases and moreover designing should be done while taking all the complicated phenomena of backward transmission into consideration. Therefore, this system is not so convenient and economical in general.

Therefore, the essential feature of the present invention is to put the frequency of the premodulated signal P in a higher, proper region than the transmission frequency band $f_1f_2$. In this invention, the band-pass filters for both pre-modulation and pre-demodulation have all the same composition and the same characteristic, and a simple low pass-filter of the same composition and characteristic is inserted between each modulator or demodulator and each coupling circuit, so as to realize a new 12-channel and 60-channel multi-channel carrier transmission system.

The conception of this invention is explained in connection with FIGS. 7, 8 and 9.

It is assumed that the transmission frequency band $f_1\sim f_2$ is $60\sim108$ kc./s. including 12 channels and the voice frequency signal $S_1$ of each channel is pre-modulated by the frequency 450 kc./s., and its upper side band $450\sim454$ kc./s. is selected as P. The ratio of frequency of the pre-modulated signal P to the transmission frequency of $60\sim108$ kc./s., that is $P/f_2$, is about 4 to 1.

As each signal P must be allocated in the transmission frequency band, so as to compose 12-channel group, the carrier frequency C applied to the channel modulator may be either higher or lower than P by $f_1\sim f_2$. In this invention, the carrier frequency C is taken higher than P (by $f_1f_2$) as will be explained later. Hence, from the first to twelfth channels, the value of each C becomes as follows, $C_1=514$ kc./s., $C_2=518$ kc./s., $\ldots$, $C_{11}=544$ kc./s., $C_{12}=548$ kc./s. In this way, the lower side band components $C_1-P_1$, $C_2-P_2$, $\ldots$ $C_{11}-P_{11}$, $C_{12}-P_{12}$ are allocated in the transmission band one after another. FIG. 8 shows a part of various modulation products in the case wherein the output sides of the channel modulators are combined by the coupled circuits. In FIG. 8, also, the component $C-P$ indicates the 12 channels of $C_1-P_1$, $C_2-P_2 \ldots$, $C_{11}-P_{11}$, $C_{12}-P_{12}$ allocated in a group. The components $C-3P$, $C-5P$ and $C-7P$ are the odd order distortion modulation products produced in the transmission frequency band which has been explained in FIG. 3. In other words, these components $C-3P$, $C-5P$ and $C-7P$ signify $C_1-3P_1$, $C_2-3P_2 \ldots$, $C_{12}-3P_{12}$ and $C_1-5P_1$, $C_2-5P_2$, $\ldots$, $C_{12}-5P_{12}$ and $C_1-7P_1$, $C_2-7P_2 \ldots$, $C_{12}-7P_{12}$, respectively. Considering only the third order distortion components $C_1-3P_1$, $C_2-3P_2 \ldots$, the frequency band of each component is 4 kc./s.$\times 3=12$ kc./s., because each frequency band of $P_2$, $P_2 \ldots$ is 4 kc./s., and each of them is only distributed in the frequency band of its own and in both the neighboring channels. Therefore, the components $C-3P$ mixing into the transmission band (4 kc.) of one channel are limited to 3 components, of its own and from both the neighboring channels.

On the contrary, if group-modulation is done in the 12-channel group frequency band (48 kc./s.) as shown in FIG. 1, the sum total of the components mixing into the transmission frequency band for one channel becomes great, because the $C-3P$ components in the group modulator produce both sum and difference components in the combination of 12 channels. In the group modulation system, which is regarded as the multi-channel pre-modulations, the communication quality is possibly deteriorated, if well-designed group modulators are not used.

The components $2C-2P$, $3C-3P$, $4C-4P$, $5C-5P$, etc. are the harmonics of the component $C-P$ to be transmitted and the component $2C-2P$ has the lowest frequency.

So far as the relation between $2f_1$ which is the doubled frequency of the minimum frequency $f_1$ of the component $C-P$ and the maximum frequency $f_2$ is constantly at $2f_1 > f_2$, it can be expected to eliminate the above component by a group band pass filter.

Of the components $2C-P$, $3C-2P$, $4C-3P$, $5C-4P$, the component $2C-P$ is in the vicinity of frequency band of 600 kc./s. and according as the degree of distortion increases the other components are distributed successively into a higher frequency band.

The components $C-2P$, $2C-3P$, $3C-4P$, $4C-5P$, $5C-6P$, $6C-7P$, etc. move gradually into the lower frequency band according as the degree of distortion augments, the component $C-2P$ having the maximum frequency of 350~400 kc./s. In this case, the components above $4C-5P$ come into the transmission frequency band. From FIG. 8, the frequency of the leakage of P that causes cross-talk effect by flowing backwards to the other channels is 450 kc./s., the leakage component of carrier frequency C being 514 kc./s. and higher, the component $2C-P$ being about 600 kc./s. and the component $C+P$ being in the vicinity of 1 mc./s.

In FIG. 9 (a), is shown one channel of the transmission side. A low-pass filter L is inserted at the output side of the channel modulator $MOD_2$, which passes the component in the transmission frequency band lower than $f_2$ (108 kc./s.) and attenuates the components above that frequency. Especially the components that deteriorate the communication quality of transmission frequency band by their backward flow must be attenuated sufficiently.

Although the components which are mixed into the transmission frequency band are unavoidable, the components of modulation products which are in the neighborhood of the transmission frequency band may be attenuated by the group band-pass filter GB.

Hence, if the distortion modulation products components $4C-5P$, $5C-6P$, etc. are admitted into the transmission band, the low pass filters L of the entirely same composition and characteristic can be used for all channels.

In order to combine the transmission components $C_1-P_1$, $C_2-P_2$ . . . ,$C_{12}-P_{12}$ in the transmission side, the conventional hybrid coil bridge transformer or well-known resistance coupling network equivalent to the said transformer may be used. Also, as shown in FIG. 9 (a), the simpler way is to construct coupling circuits which are commonly connected through the resistors $R_1$, $R_2$ . . . and then to connect the common side with the group band-pass filter.

The combined transmission components, after passing the group band-pass filter, are sent out in the states of being given required gains by the amplifier TA.

The explanation of the receiving side is omitted here, as it is merely the reverse transmission of the transmission side.

From the above explanations on FIGS. 7, 8 and 9(a), the following facts are clarified.

As every channel can be constructed with use of one kind of band pass filters for pre-modulation and one kind of low pass filters, the channels can be mass produced.

As only the frequency of the carrier waves for channel modulation differs in every channel and the other parts are composed exactly the same, the parts and apparatuses are interchangeable among the channels, which is very convenient in maintenance and repair.

When the carrier frequency C of the channel modulator is taken higher than the premodulation frequency P, that is $C > P$, the disturbing components due to the backward flow are more possibly in the higher frequency region than the case of $C < P$ being chosen, the interval between the frequencies of the disturbing components and the maximum frequency $f_2$ of transmission band becomes wider, thus facilitating designing of the low pass filters.

Next, the attenuation characteristic of the low-pass filter L of FIG. 9(a) be considered.

Now, observation is made on only the components $2C-P$ in FIG. 8, which cause the cross talk by backward transmission. The component $2Cx-Px$ produced at the Xth channel modulator $MOD_2$ is first attenuated by Le at the low-pass filter L, (the transmission component $Cx-Px$ is not attenuated here), and then through the resistor Rx of the coupling circuit for combining, transmitted to the group band-pass filter GB. Assuming that the series insertion loss of the resistor Rx is Lr. the transmission component $Cx-Px$ attenuates by Lr, and the component $2Cx-Px$ by Le+Lr.

When the component $2Cx-Px$ is transmitted backwards to the other Yth channel, the series insertion loss Lr of the coupling circuit Ry and the loss of the low pass filter Le of the Yth channel are added.

Consequently, the components attenuate by 2 (Le+lr) to reach the Yth channel modulator. This component produces the modulation product $(2Cx-Px)-Cy$ at the Yth channel modulator and then transmitted forward. In this case, the modulation loss Lm, occurring until the components pass again through the low pass filter becomes Lm+Lr until the components, through the series insertion loss Lr of the coupling circuit Ry again, reach the input side of the group band-pass filter GB.

Consequently, the attenuation loss of the transmission component $Cx-Px$ from the output side of the Xth channel modulator to the input side of the group band-pass filter is Lr and that of the component $(2Cx-Px)-Cy$ is 2 (Le+Lr)+Lm+Lr.

The amount of cross talk is therefore 2 (Le+Lr)+Lm. Actually as the level of the component $2Cx-Px$ is lower than that of the component $Cx-Px$, the said amount of cross talk is improved by the difference of the level. Here, the values of Lr and Lm are 15 db and 10 db, respectively.

As shown in FIG. 9(b), one section of the low-pass filter loses about 40 db at the frequency of 5~6 times as high as the cut-off frequency. Therefore, when such one section of the filter as shown in FIG. 9(b) is inserted in the low-pass filter of FIG. 9(a), the value of L1 is 40 db, even though $2Cs-Px$=600 kc./s. and the maximum transmission frequency $f_2$=120 kc./s. (actually 108 kc./s). Consequently, the amount of cross talk becomes 120 db.

Next, the backward transmission of the component $C+P$ is considered. The component $Cx+Px$ of the Xth channel has the same level with the transmission component $Cx-Px$. But, as they exist in the frequency region of about 1 mc./s. as shown in FIG. 8, the component loses about 50 db at one section of low pass filter as shown in FIG. 9(b). Also, when a component $2Cy-(Cx+Px)$ which is modulated by 2Cy, the second harmonics of the carrier current Cy of the Yth channel which transmits backwards mixes into the transmission frequency band, the modulation loss Lm is generally greater than that by Cy. Assuming Lm=20 db, Le=50 db and Lr=15 db, the amount of cross talk becomes 150 db.

As the frequencies of the premodulated signal P and the carrier current for the channel modulation $C_1$, $C_2$ etc. are about 4 times of the maximum transmission frequency $f_2$, the attenuation loss of one section of the low pass filter is about 35 db from FIG. 9(b). Assuming that the leakage levels of P and $C_1$, $C_2$, etc. from the channel modulators are identical with the level of the transmission component $C-P$, the amount of cross-talk is about 110 db. The component $3Cx-Px$ is near 1.2 mc./s. as shown in FIG. 8. This component is transmitted backward to the Yth channel to produce the component $$(3Cx-Px)-2Cy$$

which causes the cross-talk. Therefore, the amount of cross-talk is expected to be of similar degree to that of the component $2Cy-(Cx+Px)$.

In the foregoing examples, it has been explained how the low-pass filter eliminates the components which deteriorate the communication quality. It is desirable to place the said components in the high frequency region as far away as possible from the transmission frequency band, because attenuation loss of the attenuation band of the low pass filter is increased, but from the above examples, it can be concluded that the attenuation loss of about 40 db may be sufficient in practical use.

Apparently, it is advantageous to select the channel carrier C at the high frequency region apart from the pre-modulated signal P by the transmission frequency band.

In above explanation, it is assumed that the attenuation loss $L_r$, in the coupling circuit, of the components $2C-P$, $3C-P$ and the leakage component of C, P, etc., which are the object of backward transmission and exist in much higher frequency region than the transmission component $C-P$, is of the same value.

If the input side of the group band-pass filter shown in FIG. 9(a) is composed to have the impedance characteristic with $\pi$ termination, the terminal impedance becomes very small in its attenuation frequency band. Therefore the series insertion loss of coupling circuit to the backward transmission component in the attenuation band is apparently greater than that to the transmission component. It is equally advantageous in the receiving side to compose the common side of the coupling circuit to have $\pi$ termination impedance.

In the group modulation system in FIGS. 1 and 2, as the leakage component of P (60~108 kc./s.) exists close to the transmission band 8~56 kc./s. at the output side of the group modulator $G \cdot MOD$, the group band-pass filter GB is required to eliminate it. Generally, the group band-pass filter in the group modulation system is required to have severe characteristic, but according to this invention a greater part of the unwanted modulation products are eliminated by a simple low pass filter in every channel, so that even if the group band pass filter is inserted, its construction can be a simple one. For instance, in FIG. 8, the components $2C-2P$, $3C-3P$ and $C-2P$, $2C-3P$, $3C-4P$, etc. in the higher frequency region of the transmission band are attenuated in part by the low-pass filter, and the group band-pass filter can only give the quantity of attenuation which compensates the above attenuation deficiency and that of the low-pass filter in the higher frequency region than its leakage P as well as the quantity of attenuation necessary for the components 2P, 4P, and 6P etc. in the lower frequency region than the transmission band. Therefore the construction of the group band-pass filter becomes very simple. If the components 2P, 4P, 6P, etc. of the lower frequency region are very low in level or they are allowed to be transmitted, the group low-pass filter can be designed and placed in the circuit with its upper limit $f_2$ of the transmission band as the cut-off frequency. For the elimination of the backward transmission, besides using the low-pass filter L as shown in FIG. 9(a), there is another method of inserting the amplifier AA as shown in FIG. 9(c), which does not operate in the reverse direction, but causes attenuation loss. However, in this case, if the low-pass filter L is not inserted between the channel modulator $MOD_2$ and the amplifier AA, the amplifier AA will include leakage of P and C besides many modulation products created at the channel modulator $MOD_2$. As a result, there is possibility of occurring further modulation among these components (cross-modulation) due to the non-linear property of the amplifier AA and thus of deteriorating the communication quality. The above explanation is mainly on the transmitting side according to FIGS. 7, 8 and 9, the same explanation applies to the group band-pass filter and the low-pass filter of the receiving side which is inserted between the coupling circuit for separation the received signal and the group band-pass filter as well as each channel demodulator.

In the above detailed explanations of FIGS. 7, 8 and 9, the value of $P/f_2$ is approximately 4.1. If the value $P/f_2 \doteq 1$, and the premodulated signal P is taken for 112–116 kc./s. (the upper side band of carrier frequency $C_0 = 112$ kc./s.), and the transmission frequency band is 60–108 kc./s., then the channel carrier frequency C are: $C_1 = 176$ kc./s., $C_2 = 180$ kc./s., ... $C_{12} = 220$ kc./s. In this case, the component $2C-P$ is in the frequency band 234–328 kc./s., the unwanted side band component $C+P$ is in 228–336 kc./s., and the leakage component of P is in 112–116 kc./s. The low-pass filter L in FIG. 9(a) must pass the signal of up to the frequency 108 kc./s. and attenuate the components over 112 kc./s. This is a very severe requirement. Also the distortion modulation products components $2C-3P$, $2C-4P$, $3C-4P$, $3C-5P$ ... come into the transmission band. As there are unavoidable distortion modulation products components $C-3P$, $C-5P$ ... in the transmission band, it is desirable that other distortion modulation products components are distributed outside the transmission band in so far possible.

This is desired especially when using a channel modulator of unbalance type. Because, when a mixing channel modulation is performed by using a pentode as shown in FIG. 10, both the harmonics 2C, 3C ... of the carrier frequency C and the distortion modulation products components of the premodulated signal P are much more powerful than a balance type ring modulator. The cross modulated components of the both are accordingly powerful, which can no longer be eliminated by any filter, if they are in the transmission band.

From the above explanation, it is understood that the premodulated signal P is preferable to be allocated in the higher frequency region than the transmission frequency band. However, in practice, if the premodulation carrier frequency $C_0$ in FIG. 7 is about 600 kc./s., $P/f_2 \doteq 5.5$ and the lowest frequency of the component $4C-5P$ in FIG. 8 will become 168 kc./s., thus enabling the components to be distributed outside the transmission band. Also, if one section of the low pass filter is inserted, the value of $f_c/f$ is 0.18 as $P/f_2 = 5.5$; therefore it is possible to maintain the quantity of attenuation 40 db which is practically the desired value. In other words, in order to attenuate the disturbing components produced in one section of the low-pass filter by backward transmission 40 db or above, it is safe to say that the value of $P/f_2$ may be selected 6 and more. One section of the low-pass filter can simply be composed of one inductance element and two condensers. Now, with respect to FIGS. 11 and 12 observations are made as follows, on the assumption that P is taken for 3,080 kc./s. and the transmission frequency band $f_1-f_2$ for 60–108 kc./s., i.e. $P/f_2$ being approx. 30.

As shown in FIG. 11, the premodulation carrier frequency $C_0$, is selected at 3,080 kc./s., and then the voice frequency signal $S_1$ of all the channel is converted to the upper side band frequency of 3,080 kc./s. P. As already mentioned, when the carrier frequency C for channel modulation is arranged in the higher frequency than P by the frequency of transmission band with interval of 4 kc./s. as $C_1 = 3,144$ kc./s., $C_2 = 3,148$ kc./s. ... $C_{12} = 3,188$ kc./s., the lower side band components $C_1-P$, $C_2-P_2$ ... at the output of the channel modulators are allocated in the frequency band 60–108 kc./s.

FIG. 12 shows the modulation products resulted from combination through the coupling circuit of the outputs of twelve channel modulators. Of C and P composing the modulation products, if the higher one in degree is taken for $m$, the harmonics component of the transmission components $C-P$ having the frequency represented as $m(f_1-f_2)$, from which $2C-2P$, $3C-3P$, etc. derive, moves into higher frequency region accordingly as the degrees of the components increase. The components $2C-P$, $3C-2P$, $4C-3P$ . . ., which have the frequency that can be represented as $(m-1)(f_1-f_2)+C$, also move into higher frequency region as they come to have higher degrees than 3,108 kc./s. of the minimum component $2C-P$.

The components $3C-P$, $4C-2P$, $5C-3P$ . . . etc., which have the frequency represented as $$(m-2)(f_1-f_2)+2C$$

are also distributed in the higher frequency region above 6,352 kc./s. of the minimum component $3C-P$, when the components get higher degrees.

On the contrary, those that move into lower frequency region as $m$ becomes larger are: the component $C-2P$, $2C-3P$, $3C-4P$ . . . which have the frequency $$(m-1)(f_1-f_2)-P$$

and $C-3P$, $2C-4P$, $3C-5P$ . . . which have the frequency $(m-2)(f_1-f_2)-2P$. These components are all in the frequency region of 2 mc./s. and above, even though they are considered up to 9th degree as shown in FIG. 12.

Within the transmission frequency band and in its vicinity, there exist only the components $C-3P$, $C-5P$, . . . and $2C-2P$, $3C-3P$ . . . etc., which are always unavoidable at the time of modulation. Therefore, the cut off frequency of channel modulator may be 108 kc./s., and at the frequency of 2 mc./s. about 20 times higher than the cut off frequency, its attenuation is 65 db by one section filter as shown in FIG. 9(b).

The component $2C-2P$ near the transmission frequency band and the components $2P$, $4P$, $6P$ . . . which are in the low frequency region, may be eliminated by the group band-pass filter. As the band width of the component P is 4 kc./s., the component $6P$ distributes in the range of up to 12 kc./s. and even the component $8P$ up to 16 kc./s. as seen from FIG. 3. However, when the group modulation system is employed, as the frequency band becomes broad and the components become close to the transmission frequency band, the group band-pass filter is required to have the sharp attenuation characteristic, which is the disadvantageous point of this system. FIGS. 11 and 12 denote that in order to select the single side band at the frequency of 3,080 kc./s. a band-pass filter for premodulation is necessary.

An example thereof is shown in FIG. 13. The filter takes as its elements 12 pieces of circular crystal resonator of 0.1 mm. thick and 14 mm. in diameter.

In this invention, the low-pass filter is inserted in each of the channel modulators as shown in FIG. 9(a). The following are the explanations of the possibility of this low-pass filter being omitted.

Even if the circuit like FIG. 10 is used as the channel modulator or demodulator, it is the usual practice to employ additionally a transformer $T_2$ at the output and $T_1$ at the input side. Similarly, transformers are used at both the input and the output sides of the ring modulator composed of diode rectifier elements. In the higher frequency region than the frequency of the transformers transmission band, the equivalent circuit in FIG. 15 can be used, where $l_1$ and $l_2$ are the leakage inductance of the primary and secondary sides, and $Cd$ is its distributed capacity. As is well known, this equivalent circuit has the frequency characteristics of low-pass filter. As the value of each element constant of this equivalent circuit can be introduced to some extent at the time of designing the transformer it is possible to give the transformer necessary attenuation frequency characteristic in the higher frequency region which is created by establishing the cut-off frequency at a proper point of the upper limit of the transmission band. Further, as shown in FIG. 15(b), if the capacitors $C_1$ and $C_2$ are connected in parallel from outside at the primary and secondary sides of the transformer, and their capacities are so chosen that they compose a normal low pass filter with the transformer, the attenuation characteristic of the attenuation band can be much improved together with the transmission characteristic of the pass band.

FIGS. 16 and 17 are the examples of the characteristics of such transformers. FIG. 16 indicates the return loss frequency characteristic of the pass band of a transformer designed to have the impedance ratio of 75 ohms to 75 ohms and to have the transmission frequency band of 12–180 kc./s. The characteristic curve 1 corresponds to the case of FIG. 15(a) and the curve 2 to the case of FIG. 15(b), and the latter is designed by the method of Chebishv's approximation, and composed of the leakage inductance $l_1$, $l_2$, the distributed capacity $Cd$ and condensers $Cf_1$ and $Cf_2$ as circuit elements.

Comparing both the characteristic curves 1 and 2, the curve 2 maintains the value 20 db of return loss all over the transmission frequency band, but the curve 1 does not satisfy this standard in the vicinity of the upper limit of the transmission band. The loss frequency characteristic curves 1 and 2 of FIG. 17 correspond to the curves 1 and 2 of FIG. 16, respectively. The curve 2 has more improved characteristic than the curve 1 in the vicinity of the upper limit of the transmission frequency band and, in the high frequency region, its attenuation is improved over-whelmingly in comparison with the curve 1.

The characteristic curve 2 in FIG. 17 shows that the loss is about 40 db at 3 mc./s. and 53 db at 4 mc./s. Hence, if this characteristic is applied to the output transformer of each channel modulator and the input transformer of each channel demodulator in FIGS. 11 and 12, it proves that the low-pass filter is unnecessary. This is a very economical method which characterizes this invention.

Figure 14B:
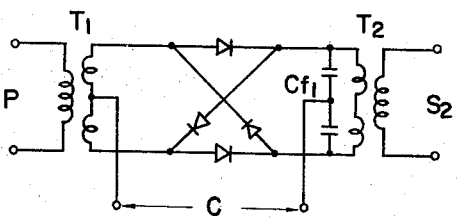

As shown in FIG. 14(b), in the ring modulator, etc., it is a frequently used method to supply the carrier frequency C that 2 pieces of condenser $Cf_1$ are connected and its middle point is utilized. In this case, it is more economical to utilize the series capacity of the above two condensers as $Cf_1$ of FIG. 15(b) or a part of it along with other elements of FIG. 15(b).

In this way, when the low pass filtration characteristic is imparted to the transformer, the system in FIG. 11 will be composed as FIGURE 18.

In each channel of the transmitting side, the pre-modulator $MOD_1$ is applied by ultra-high frequency of 3 mc./s. or above as the carrier frequency $C_o$, and at its output side, only the required single side bend frequency P is chosen by way of the band pass filter BF as shown in FIGURE 13, supressing the other components. When the level of pre-modulated signal P is comparatively low, it is amplified properly by the amplifier AA and then applied to the channel modulator $MOD_2$. As the output transformer of this modulator is given the low-pass filtration characteristic as already mentioned, there exists at the output side only components of $2P$, $4P$ . . . , which is distributed in the lower frequency region than the transmission band, besides the transmission component $S_2$ and the unavoidable components of $C-3P$, $C-5P$ . . . ; and the harmonics distortion components $2C-2P$, $3C-3P$, etc. are gradually attenuated in accordance with the low pass filatration characteristic and mix into the channels.

By connecting the series regiestance $R_1$, $R_2$ . . . of the coupling circuit, the component $S_2$ from every every channel is combined and applied to the group band pass filter GB.

In GB the said components 2P, 4P . . . and the distortion modulation products being distributed in the high frequency region, which are not attenuated sufficiently by the transformers are attenuated again, and then the transmitting components is amplified by the transmission amplifier AA and transmitted.

Therefore, in this case, the group band-pass filter GB can only suppress mainly the components 2P, 4P . . . , and 2C—2P, 3C—3P . . . etc. that have the frequency band of $m \, (f_1-f_2)$. So that the filter becomes very simple.

In the receiving side the signal is transmitted reversely, that is the receiving amplifier RA is a common amplifier to all the channels like the transmitting amplifier TA, and the signal components, transmitted from the entire channels and passed the group band-pass filter GB of the output side, is equally alloted to each channel demodulator $DEM_1$.

As the carrier frequency C of each channel demodulator is different, like $C_1$, $C_2$, etc., only the channel signal corresponding to each carrier frequency C is selected by the band-pass filter BF. Of course, the input transformer of the channel demodulator is given the low-pass filtration characteristic, like the output transformer of the said channel modulator. The signal P of the very channel selected by the band-pass filter BF is amplified by the amplifier AA and then transmitted to the demodulator $DEM_2$ just as the said pre-modulator. To the demodulator $DEM_2$ is applied the carrier frequency $C_0$, and the voice frequency signal $S_1$ is re-produced at the output of the demodulator $DEM_2$. The signal $S_1$ is amplified by the voice frequency amplifier VA, and sent out. The output transformer of the demodulator $DEM_2$ can stop the leakage of the carrier frequency $C_0$ and the input signal P, etc. by giving the low pass filtration characteristic as mentioned. Similarly, if the input transformer of the pre-modulator $MOD_1$ at the transmission side is given the low-pass filtration characteristic, the leakage of the carrier frequency $C_0$, which might flow backwards to the input side of the voice frequency signal, can be suppressed almost perfectly. So the low-pass filter LP, is generally unnecessary. When the amplifier AA is inserted as shown in FIG. 18, the input and output transformers of the sending side can be composed by both the output transformer of the band-pass filter and the input transformer of the channel modulator $MOD_2$. Similarly, too, if the input transformer of the receiving side's amplifier AA is so composed as to serve as the output transformer of the band-pass filter BF, and the output transformer of the amplifier AA as the input transformer of the demodulator $DEM_2$ it will be economical. As the transmission amplifier TA and the receiving amplifier RA amplify the signals of all the channels in common, they are of high quality with less distortion and larger gain and of negative feedback type and the like.

Although they are expensive, as the number of TA and RA required is only one each, they affect the cost of the system only slightly. On the contrary, the amplifier AA is required for each channel, it must be designed as economical as possible.

FIG. 18 indicates that the voice frequency signals $S_1$ are twice converted to be allocated in the transmission frequency band. The gain of the amplifier AA compensating this conversion loss had better be kept as small as possible to suppress deterioration of the signal to noise ratio S/N, and its output level should also be lower. Because, in that case, the stages of amplification decrease, the size of the output transformer becomes small and the ratio of signal to the distortion components caused by the non linearity of the amplification characteristic is improved. Thus, it is economical to decide the level diagram of each part of the system in such a way that in the transmitting side frequency conversion is done by lower level as far as S/N allows and the required gain and output level are loaded on the transmitting amplifier, and, in the receiving side, the required gain and the output level is shared by the voice frequency amplifier VA for the same reason.

So far, explanations have been made on the 12 channel system of the transmission frequency band 60–108 kc./s. Next, the 60-channel system to be composed in the transmission frequency band 312–552 kc./s. by this invention will be explained using FIGS. 19 and 20. As shown in FIG. 19, the voice frequency signal $S_1$ is first modulated by the premodulation carrier frequency $C_0$ of 5 ms./s. for all the channels, and the upper side band is taken for P. The P of each channel is modulated at the next channel modulator by 60 carrier frequencies of $C_1=5,316$ kc./s., $C_2=5,320$ kc./s. . . . $C_{60}=5,552$ kc./s., respectively, and then the lower side band components $S_2$ are combined.

Thus, the 60 channels are allocated in the frequency band 312–552 kc./s.

In this case, the distribution of the modulation products as the result of each channel modulation is shown in FIG. 20. Of the components $(m-1)(f_1-f_2)-P$, the component 8C–9P approach the transmission frequency band.

But, the leakage component P and the higher degree components are distributed in the high frequency region about 10 times distant from the upper limit of the transmission band. Therefore, the low-pass filter, inserted between the channel modulator or demodulator and the coupling circuit, attenuates by 55 db, if it is composed of one section as shown in FIG. 9(b), which is satisfactory.

In the case that the system in FIG. 19 is formed, if the low-pass filter inserted between the channel modulator or demodulator and the coupling circuit is substituted by the transformer circuit as explained in FIG. 18, the transformer may be such one as shown in FIG. 21. FIG. 21 is the example of the measured frequency-loss characteristic of the transformer designed to have the pass-band of 60–552 kc./s. and the impedance ratio of 600 to 75 ohms. Generally, in the frequency region lower than the pass-band of a transformer, its equivalent circuit becomes like FIG. 15(c), where L is the main inductance. Therefore, if the condensers $Cs_1$ and $Cs_2$ are connected in series as shown in FIG. 15(d), it must have high pass filtration characteristic. Consequently, if the circuit b and d in FIG. 15 are combined, the resultant circuit can be expected to have band-pass filtration characteristic. The characteristic curve 1 in the FIG. 21 is the transformer itself, and the curve 2 is the characteristic of the transformer in the case that condensers $Cs_1$, $Cs_2$, $Cf_1$ and $Cf_2$ both in series and in parallel are introduced as the designing elements along with the equivalent circuit of the transformer, so that the band-pass filtration characteristic may be obtained.

As the distortion modulation products components 2P, 4P, 6P, etc., though not shown in FIG. 20, exist in the low frequency region at the output of the channel modulator, if the transformer with the band-pass filtration characteristic as shown in the curve 2 of FIG. 21 is used, these distortion modulation products can be suppressed. So, the group band-pass filter may possibly be substituted by a simple group low-pass filter. It is evident from FIGS. 17 and 21 that an additional filter may be used when the attenuations of the filtration characteristic of these transformers are insufficient for the required value, a separate filter can be inserted successively with the transformer.

An example of the band-pass filter for 5 mc./s. premodulation to be used FIG. 19 is shown in FIG. 22.

This filter is composed of 2 circular crystal resonators 14 mm. in diameter and 8 of 8 mm. in diameter.

Thus, it will be verified from FIGS. 13 and 22 that the present invention can possibly choose the frequency of the pre-modulated signal P in the ultra high frequency region of 3–5 mc./s.

It is concluded that in the system of identical premodulation to each channel as proposed by this invention, if the frequency of the pre-modulated signal P is selected at the frequency about 6 times higher than the transmission frequency band $f_1-f_2$, the multi-channel carrier transmission system of 12 channels in the frequency of 60–108 kc./s. and 60 channels in 312–552 kc./s. is sufficient to have one section of the low-pass filter to be connected with the channel modulator and demodulator.

Therefore, in this invention, if it is difficult to design and manufacture the band-pass filters for the premodulation having the characteristics as shown in FIGS. 13 and 22 in the ultra-high frequency region as required in FIGS. 11 and 19, a plural and successive premodulation system which performs twice or more premodulations is preferable as explained in FIGS. 23 and 24.

As shown in FIG. 23, the voice frequency signal $S_1$, is modulated by the carrier frequency $C_{o1}$ at the first pre-modulator $MOD_1$. The band-pass filter $BF_1$, has the characteristic as shown in FIG. 24(a), which attenuates the unwanted upper side band $P+1$ by $l_{b11}$ and passes the lower side band $P-1$. These $P+1$ and $P-1$ are further modulated by the carrier frequency $C_{o2}$. At the second premodulator $MOD_2$. This $C_{o2}$ is so selected that $C_{o1} \pm C_{o2}$ has the same value with the aforementioned pre-modulation carrier frequency $C_o$. Now, assuming $C_{o1}-C_{o2}=C_o$, the band-pass filter $BF_2$ has the characteristic that is shown in FIG. 24(b), which selects the lower side band $C_{o2}-P-1$ as the premodulated signal $P$ and, at the same time, attenuates the component $C_{o2}-P+1$ by $l_{b21}$; and also, both the upper side band components $C_{o2}+P-1$ and $C_{o2}+P+1$ are attenuated as sufficiently as required. That the signal P, (or, $C_{o2}-P-1$) selected by the band-pass filter $BF_2$ after being amplified by the amplifier AA in FIG. 23, converts to the required transmission frequency band by the channel modulator $MOD_3$ is exactly the same way as the aforementioned embodiments of this invention.

The unwanted side band component $P+1$ at the first pre-modulator MOD, is suppressed by $l_{b11}+l_{b21}$ more than the transmission component $P-1$, until it is converted to the transmission frequency band.

Now, if it is difficult to design and manufacture the such band-pass filters as shown in FIG. 13 and 22, the following items (1), (2) and (3) are deemed to be the causes for the difficulty.

(1) To be difficult to get the sharpness in the cut-off frequency characteristic of the frequency nearly corresponding to the upper and lower frequency limits, 3.4 kc./s. and 0.3 kc./s. of the voice frequency signals.

(2) To be insufficient of attenuation at the frequency corresponding to the carrier frequency to suppress leakage of the carrier frequency.

(3) To be difficult to maintain in the ultra-high frequency region (3–5 mc./s.) the required attenuation including suppression of the unwanted side band frequency in the attenuation area, due to disturbance of stray couplings in arrangement of elements as well as wiring etc. (In the general multi-channel carrier transmission system, the attenuation amounts to 65 db.)

In the double pre-modulation system of this invention shown in FIG. 23, designing is done preponderantly so that the band-pass filter $BF_1$, for the first premodulation may solve the difficulties in items (1) and (2), and the band-pass filter $BF_2$ for the second pre-modulation may solve the difficulty in item (3). This will be explained by FIG. 24.

In the first band-pass filter, the equivalent frequency to 0.3 kc./s. of the transmission component $P-1$ is exactly in the pass-band, and, at the point of carrier frequency $C_{o1}$ which is 0.3 kc./s. higher than the pass-band, has the attenuation $l_{co1}$ necessary for suppressing the carrier leakage, and the frequency band above this $C_{o1}$ is made the upper attenuation band, the attenuation obtained therefrom being designated as $l_{b11}$. Also, the equivalent frequency to 3.4 kc./s. of the signal frequency $S_1$, is exactly in the pass-band. And the lower frequency region than that is designated as the lower attenuation area and the obtained attenuation is made $l_{b12}$.

If the required value of the carrier leakage attenuation $l_{co1}$ is large, it is preferable to design the filter so as to have its attenuation pole at the frequency $C_{o1}$. As will be mentioned later, the telephone circuit requires the call signal frequency, which is generally allocated outside the voice frequency signal $S_1$, its frequency being $f_r$ with 3,825 or 3,850 cycles adopted. Therefore, as the components near $f_r$ involved in the voice frequency signal components disturb the transmission of the call signal, they should be suppressed. For this purpose, it is effective to give the frequency $(C_{o1}-f_r)$ equivalent to $f_2$ of the band-pass filter the attenuation pole, the value of attenuation being $lfr$.

Thus, the first band-pass filter BF is designed mainly aiming at satisfying the required standard of the cut-off frequency characteristic in the vicinity of the upper and lower limits of the transmission component and simultaneously at securing sufficient attenuation even in the frequency equivalent to the call signal outside the transmission band, besides suppressing the leakage of the carrier frequency, and the attenuation $l_{b11}$ and $l_{b12}$ at the upper and lower parts of the attenuation band is not considered so important.

In line with the above-mentioned designing principle, the most proper frequency band, in which the filter can be easily realized with the minimum number of elements is 100–6— kc./s. or in its vicinity, if a crystal resonator is used, or 10–30 kc./s. or so, if a magnetic core inductance and condensers are used as the elements.

There are two main points in designing the second band-pass filter $BF_2$. The one is that the second band-pass filter should supplement at its attenuation band the shortage $l_{b22}$ against the lower part attenuation $l_{b12}$ of the first band-pass filter and the shortage $l_{b21}$ against its upper part attenuation $l_{b11}$, required of the unwanted side band $P+1$ and the neighbouring channels inclusive. The other is that the second band-pass filter must give the attenuation $l_{b23}$ as much as required, which suppresses the leakage components and the unwanted side band components $C_{o2}+P-1$ and $C_{o2}+P-1$ of the carrier frequency $C_{o2}$ at the second premodulator $MOD_2$. The attenuation $l_{b23}$ by the band-pass filter $BF_2$ inserted in the output side of the receiving channel demodulator $DEM_1$ is to suppress the carrier leakage component and the unwanted side band components.

Now suppose that the value of the required attenuation of the components of one side of the voice frequency signal $S_1$ including the unwanted side band component is 65 db, and that of the opposite side conmponents is 58 db. It is sufficient to allot the attenuation of the band-pass filters $VF_1$ and $BF_2$ so as to make $l_{b11}+l_{b12}=65$ and $l_{b12}+l_{b22}=58$ db. as seen from FIG. 24. In FIG. 25 is an example of designing the first band-pass filter $BF_1$, in which 4 crystal resonators are used and the carrier frequency $C_{o1}$ is taken as 100 kc./s., with a view to keeping the transmission loss deviation of the pass band (0.3–3.4 kc./s.) at 0.5 db. and less, and the suppression of both the carrier frequency and the call signal frequency of 3,825 cycles, at 30 db. and more, considering the attenuation $l_{b11}$ and $l_{b12}$ of each of the upper and lower parts as secondary. In this example, both $l_{b11}$ and $l_{b12}$ are maintained at 20 db. and more. Therefore, using this filter, the second band-pass filter $BF_2$ requires the attenuation of $l_{b21}=65$ db—20 db=45 db and $l_{b22}=58$ db—20 db=38 db.

From FIG. 24(b), the cut-off characteristic of the second band-pass filter $BF_2$ is sufficient to have the attenuation $l_{b21}$ at 45 db at the frequency 600 c./s. apart from the lower cut-off frequency, and the attenuation $l_{b22}$ at 38 db at the frequency 475 c./s. apart from the upper cut-off frequency. In the band-pass filters shown in FIGS. 13 and 22, as they are required to realize the attenuation of 65 db and 58 db, respectively, the transmission loss frequency characteristic in the pass-band is apt to be deteriorated. And at the same time, in order to maintain the attenuation of about 65 db in the ultra-high frequency region, utmost of care must be taken in arranging elements, wiring, testing and adjusting, otherwise the filter cannot maintain such attenuation due to stray couplings.

On the contrary, if the double pre-modulation system is adopted, the required attenuation is enough to about 45 db, with the result that the number of the elements decreases and testing and adjusting becomes simple. This is very advantageous in designing and manufacturing of the filter.

The frequency of the attenuation $l_{b23}$ of the second band-pass filter is apart by the difference of the first pre-modulation frequency $C_{01}$ and even in case of the filter being inserted in the output of receiving side channel demodulator, the attenuation frequency separates by the difference of the transmission frequency band. Therefore, when the crystal resonator is used as the element, it is very easy to maintain the required value.

FIG. 25 is an example of the first band-pass filter $BF_1$, in the frequency of 100 kc./s. But, it may be allowed that the frequency is selected around 600 kc./s. or about 10–30 kc./s. using a magnetic core inductance and condensers as its elements, or in the vicinity of 455 kc./s. making use of a mechanical resonator.

In the double pre-modulation system already explained by FIGS. 23 and 24, the prime object of the first band-pass filter is to sharpen the characteristic around the cut-off frequency and at the same time to suppress the leakage of the carrier frequency and, if necessary, to suppress even the components in the neighbourhood of the call signal frequency outside the transmission frequency band.

The second band-pass filter aims at giving required attenuation in the frequency region apart from the neighbourhood of the above-mentioned cut-off frequency. Thus, considering the natures of these two filters integrally, this system is designed so as to realize the required rigid characteristics.

In order to realize this system in the most economical way, it is necessary to select the quality, quantity as well as size of the material for the filter element, and to allocate the carrier frequency $C_{01}$ and $C_{02}$ and the attention values of $l_{b11}$, $l_{b12}$, $l_{b21}$ and $l_{b22}$.

The band-pass filter shown in FIG. 13 is composed of the 12 crystal resonators. If the embodiment in FIG. 25 is used as the first band-pass filter $BF_1$, in the double pre-modulation system, it can be composed of 4 crystal resonators and also the second band-pass filter $BF_2$ can be composed of 6 and less crystal resonators. This helps decrease the number of overall filter elements and at the same time contributes to easy and economical designing and manufacturing.

The foregoing is the explanations about the double pre-modulation system. However, if when the voice frequency signal $S_1$ is converted to the higher frequency by the duplex pre-modulation method, the transmission characteristic is deteriorated and cannot meet the required standard, it is better to employ the plural successive pre-modulation system, where, in accordance with the same designing principles as already mentioned, the stage of modulation is increased more than three times, that is, the modulation process is repeated successively.

In this case, the frequency band near the voice frequency signal $S_1$ is naturally shared with the aforementioned items (1) and (2) and the frequency band near the higher frequency band P is shared with the item (3).

Now, the system, in which the frequency of 3,825 c./s. existing outside band-pass of the voice frequency signal is used as the call signal, is explained by FIG. 23. In the first band-pass filter $BF_1$, of the transmitting side, the frequency $F_r$ of the call signal $R_r$ is in the attenuation region as shown in FIG. 24(a). Therefore, the frequency components at the vicinity of $f_r$, involved in the voice frequency signal $S_1$, are suppressed by the first band-pass filter $BF_1$. When the component $C_{01}-f_r=C_{01}-3,825$ c./s. properly given with information by the call signal $S_r$ enters into the input side of the second modulator together with the component $P-1$, the signal is transmitted to the receiving side, because the frequency is in the pass-band of the second band pass filter $BF_2$. At the receiving side, the component $(C_{01}-3,825)$ c./s. demodulated by the second demodulator $DEM_2$ is separated from the voice signal component $(C_{01}-P-1)$ by the narrow band-pass filter $BF_3$. This component $(C_{01}-3,825)$ c./s., after amplified by the amplifier RR, is reproduced by the relay L or by the reproduction circuit of the call signal similar to the relay. In this case, the selectivity of the narrow band-pass filter $BF_3$ is easily realized from the technical standpoint. An example of the characteristic where $C_{01}=600$ kc./s. is shown in FIG. 26. This narrow band pass filter is composed of 4 crystal resonators. In this invention as many different kinds of the carrier frequency $C_1$, $C_2$ . . . for channel modulation as the number of the channels are required, and also the carrier frequency $C_0$ for premodulation. For instance, in the case of FIG. 11, the following frequencies are needed: $C_0=3,080$ kc./s., $C_1=C_0+64$ kc./s.$=3,144$ kc./s., $C_2=C_0+68$ kc./s. $=3,148$ kc./s. . . . $C_{11}=C_0+104$ kc.$=3,184$ kc./s. and $C_{12}=C_0+108$ kc./s.$=3,188$ kc./s. If these carrier frequencies for various modulation are produced by independent oscillators, variations in the frequency are unavoidable, even if the oscillators are packaged in thermostatic ovens. In the multichannel carrier transmission system, transmission is often done in the long distance, which necessitates to regulate its frequency variation in a most severe way. When the component P pre-modulated by the ultra high frequency (over 3 mc./s.) is converted by channel modulation to the far lower transmission frequency band than the ultra high frequency band as in this invention, the frequency variation of the carrier frequency for pre-modulation and channel modulation, must be suppressed as far as possible to meet with the required standard.

In such a case, if the method shown in FIG. 27 as an example is employed, it is possible to compensate easily the frequency variation of the ultra high frequency. In FIG. 27, 12 oscillators of 64, 68 . . . 104 and 108 kc./s., which correspond to the carrier frequencies in the transmission band of each channel, are first manufactured. If crystal oscillators are used, the frequency variation of about $5\times 10^{-6}$ in the temperature range of 20° C.$\pm$15° C. is easily realized without using the thermostatic oven.

Also, the method has so far been used often, wherein a stable main oscillator of 4 kc./s. frequency is placed, the output of which being added to the generating circuit of the higher harmonics to obtain the component up to 27 times of the original frequency (4 kc./s.), the obtained frequency ranging from 64–108 kc./s. then being selected for each required frequency component by using 12 band pass filters.

At any rate, it is not so difficult from technical viewpoint as to regulate the frequency variation in about $10^{-6}$ up to the frequency band of about 108 kc./s. Here, it is assumed that such a source of oscillating frequency be: $F_1=64$ kc./s.$+\delta f_1$, $F_2=68$ kc./s.$+\delta f_2$ . . . $F_{11}=104$ kc./s.$+\delta f_{11}$ and $F_{12}=108$ kc./s.$+\delta f_{12}$, respectively and the frequency of the oscillator for the premodulator carrier frequency be: $C_0=3080$ kc./s.$+\Delta f$. The components $F_1$, $F_2$, $F_3$ . . . $F_{12}$ and the component $C_0$ is applied to the modulator M in FIG. 27 to produce the components $C_0\pm(F_1+F_2+\ldots +F_{12})$. Out of this, the sum components $C_1=C_0+F_1$, $C_2=C_0+F_2$ . . . $C_{11}=C_0+F_{11}$ and $C_{12}=C_0+F_{12}$ are selected by the narrow band-pass filters $B_1$, $B_2$ . . . $B_{11}$ and $B_{12}$, which is then used as the channel modulation carrier frequency. Thus, the voice frequency signal $S_1$, when it is premodulated to P, becomes: $P=C_0+S_1=3,080$ kc./s.$+\Delta f+S_1$ as P stands for $C_0+S_1$.

This P is then converted to the signal $S_2$ in the transmission frequency band by channel modulation. For instance, the signal $S_2$ in the first channel becomes as follows.

$$S_2 = C_1 - P = C_0 + F_1 - P$$
$$= 3{,}080 \text{ kc./s.} + \Delta f + 64 \text{ kc./s.} + \delta f_1 - P$$
$$= 64 \text{ kc./s.} + \delta f_1 - S_1$$

The only descrepancy in the frequency is $f_1$. That is, the frequency variation of the independent oscillator of the ultra high frequency 3,080 kc./s. is characterised by being independent of the transmission frequency $S_2$.

In the double pre-modulation system as shown in FIG. 23, the frequency $C_{o1}$ of the independent oscillator for the first pre-modulation and the frequency $C_{o2}$ of the same for the second premodulation are admixed to produce the frequency component of $C_{o1} \pm C_{o2}$. After selecting the necessary component from this, the component is taken for $C_{o1} \pm C_{o2} = C_o$. Then using the same method as in the foregoing, it is apparent that the frequency variations of the independent oscillators $C_{o1}$ and $C_{o2}$ can be made independent of the transmission frequency $S_2$.

As explained in the preceding, it is possible to compensate perfectly the frequency variation of the carrier frequency for pre-modulation and channel modulation by modulating the carrier frequency $C_o$ for pre-modulation with the frequency $F_1, F_2 \ldots$, corresponding to the transmission band which satisfies fully the allowable limitation of the frequency variation in transmission, and by using the component $C_o \pm (F_1, F_2 \ldots)$ thus produced as the carrier frequency $C_1, C_2 \ldots$ for the channel modulation.

Although the filters $B_1, B_2 \ldots B_{11}, B_{12}$ for selecting the carrier frequency in FIG. 27 have in general an interval of 4 kc./s., therefore design and manufacture of the filters are very easy.

FIG. 28 is an example of the said filter. This filter is used when the pre-modulation frequency is selected to be near the ultra high frequency of 5 mc./s., and it has the attenuation of about 80 db at the frequencies $\pm 4$ kc./s. apart from 5 mc./s. band. Its pass band is $\pm 300$ c./s. and it is composed of four crystal resonators.

The main points of this invention which have so far been explained in connection with many examples can be concluded as follows:

(1) In a multi-channel carrier transmission system composed of 12 channels in the frequency band of 60–108 kc./s., or of 60 channels in 312–552 kc./s. or of other channels having the frequency band under 500 kc./s., the voice frequency signal $S_1$ in all the channels of the sending side is converted to the same high frequency band P which is about 6 times or more higher than the maximum frequency $f_2$ of the transmission frequency band $f_1 - f_2$ by pre-modulation process.

This pre-modulated signal P is subjected to the channel modulation with the carrier frequency C which has different frequency in each of the channels. And when the lower side band $C - P$ of the signal frequency is selected and combined by the low pass filters of equal values in each channel, it is successively allocated to the transmission band $(f_1 - f_2)$ as predetermined. The receiving side of this multi-channel carrier transmission system is characterised by that transmission of the receiving side is reverse to that of the transmission side.

In order to realize the above mentioned system of this invention, the following technical means are very useful from the economical point of view.

(2) The signal P pre-modulated in the frequency band of about 6 times or more higher than the upper limit frequency $f_2$ of the transmission frequency band is adopted. Consequently, since the phenomenon of backward transmission and most of the distortion modulation products which produce disturbing effect are distributed in the high frequency region apart from the transmission frequency band, the simple low-pass filter of one section type which is inserted between the channel modulator-demodulator and the coupling circuit gives satisfactory results.

This fact has been explained in FIGS. 16, 17 and 21, that is, as shown in these embodiments, if the equivalent circuit constants of the output input transformers of the channel modulator and demodulator in the outside of the transmission frequency band is utilized in designing the transformer as the element of the low pass filter or the band pass filter if required, it becomes far effective. And, especially, if the transformer is imparted with the characteristic of the band pass filtration, it can eliminate the distortion modulation product components of 2P, 4P, 6P . . . etc. which are distributed in the lower frequency band than the transmission frequency band, thus enabling the use of the group low pass filter.

(3) When the channel carrier frequency C to be applied to the channel modulator and demodulator is selected of a higher frequency than the pre-modulated frequency P, i.e., $C > P$, the attenuation of the low pass filter which is inserted between the channel modulator or demodulator and the coupling circuit is increased more than the case of $C < P$, resulting in good effect, because the disturbing components caused by the backward transmission is in the higher frequency region.

(4) If the coupling circuit side of the group band-pass filter or the group low-pass filter inserted between the coupling circuit and the transmitting or receiving amplifier is given with the impedance characteristic of $\pi$ termination, the insertion loss of the coupling circuit to the backward transmission currents to the other channels increases in the attenuation frequency band of the filter rather than in the transmission frequency band. This is effective to minimize the crosstalk due to backward transmission.

(5) In the stage of frequency conversion of each channel, the gain and output level of the amplifier AA which is inserted in each channel to compensate the conversion loss are made to be of minimum allowable value relative to the required S/N value. If the gain and output level required for the overall transmission system are acquired by the transmission amplifier and the receiving voice frequency amplifier, the amplifier AA necessary for each channel can be made simpler.

(6) As described in connection with FIG. 18, the input and output transformers of the amplifier AA which is inserted in the stage of frequency conversion of each channel can be composed economically by using in common the transformers being used for the band pass filters, modulators and demodulators, etc. which are connected before and after the amplifier AA.

(7) In order to convert the voice frequency signal $S_1$ to the predetermined high frequency band P, a system adopting plural successive premodulation is employed, wherein the sharpness of the cut-off characteristic of the frequency in the neighborhood of the upper and lower limits of the voice frequency signal $S_1$ and suppression of the carrier frequency leakage are chiefly shared in the frequency band near the voice frequency signal $S_1$ and according as it approaches the high frequency band of P, the attenuation in the attenuation band is shared. This may facilitate designing and manufacturing of the band pass filter in comparison with the case of converting the voice frequency signal $S_1$ to the ultra-high frequency band P by one stage of pre-modulation.

(8) The frequency components of $F_1, F_2 \ldots$ corresponding to each channel carrier frequency in the transmission frequency band are produced by use of a stable oscillator power source, and are modulated by them the resultant frequency $C_o = C_{o1} \pm C_{o2} \pm \ldots$ of the carrier frequencies for pre-modulation $C_{o1}, C_{o2} \ldots$, and when a generator of the carrier frequency for selecting the required channel modulation carrier frequency from the side band components $C_o \pm (F_1, F_2 \ldots)$ thus produced, the frequency variation of the oscillator for the pre-modulation carrier frequency becomes independent of the transmission component. This means that when the oscillation frequency of the carrier oscillator for pre-modulation is converted to the ultra-high frequency of 3–5 mc./s., a certain degree of allowance is permitted to frequency stability and accuracy, which makes the designing easy.

The characteristics of this invention are as follows:

(a) In comparison with the ordinary group modulation system which is regarded as a multiple pre-modulation system and the pre-modulation system of this invention, with respect to the modulator, the modulation product components $C \pm 3P$, $C \pm 5P$ ... produced from the carrier frequency C and the sum and difference frequency components $3P$, $5P$ ... of the odd order of the input signal P, which are mixed unavoidably into the output transmission frequency band, are much smaller in the pre-modulation system of the present invention than in the conventional group modulation system, because, according to this invention, the input signal P has the band width of 4 kc./s. for one channel, but, in the group modulation system, the input signal P of the group modulator for allocating 5 sets of 12 channels having the frequency band of 60–108 kc./s. in the frequency band of 312–552 kc./s., for example, is multiple and has the band width of 48 kc./s. for 12 channels. Therefore, the components produced per one channel frequency band of the sum and difference frequency components occurred by the cross modulation of the input signal P become overwhelmingly large in the group modulation system. Hence, the distortion of the channel modulator in the present invention can be made larger than the distortion required for the group modulator. In other words, as the tolerance toward the occurrence of the distortion is large in this invention, the standard which is required of the pre-modulator can be made lower than the case of the group modulator.

(b) Inasmuch as the pre-modulation system in the ordinary radio communication as well as in the conventional multi-channel carrier communication is difficult to perform direct conversion of the voice frequency $S_1$ in the required transmission frequency band, pre-modulation is achieved in a proper frequency region lower than the transmission band. Whereas, this invention is characterised by that the frequencies of all the channels are equally converted or shifted into the high frequency band P of about 6 times as high as the transmission frequency band, or by plural and successive pre-modulation when it is not suitable for converting the frequency directly, and then are modulated by the channel modulator, and finally the lower side bands, which consists the difference frequency, are allocated in the transmission frequency band existing in the frequency region of about ⅙ or less, of P as predetermined.

Although the present invention seems, at first sight, to be similar to the conventional plural successive pre-modulation system, it fundamentally differs from the ordinary one from the viewpoint of its purpose and means.

The main object of the conventional system is to solve the technical difficulty in direct conversion of the frequency to the desired transmission frequency band, and its remarkable characteristic is to provide a perfect standard of attenuation in the attenuation region required for the band pass filter of the output side of the first pre-modulator. Since the signal frequency component is converted gradually up to the desired high frequency region by repeating modulation successively and plurally, the unwanted side frequency separates, at every stage of pre-modulation, is shifted by amount corresponding nearly to twice the carrier frequency for the premodulation, as explained in FIGS. 5 and 6. Consequently, this system facilitates designing of band pass filter for selecting the signal frequency of the single side to be transmitted.

This invention relates to a system in which the input signal P and carrier frequency C are selected to be extremely higher than the transmission band, and the difference frequency component $C-P$ containing slight distortion is easily selected and transmitted by simple filters.

Even in case the voice frequency signal $S_1$ is pre-modulated plurally and successively, the very characteristic of this system, as explained in FIGS. 23 and 24, does not satisfy the required standard of the attenuation in the attenuation region of the band pass filter of the output side of the first premodulator, but when the frequency reaches the desired pre-modulation region P after being premodulated for two or three times in succession, it is able to satisfy the desired standard of the unwanted side band suppression, etc., in the first pre-modulation, as an integral result.

(c) As shown in FIG. 1, the group modulation system requires as many kinds of band-pass filters as the number of its channels. In the conventional pre-modulation system as explained in connection with FIGS. 5 and 6, besides the band-pass filters for pre-modulation having the same characteristic and construction, different kinds of band-pass filters for channel modulatin are necessary. However, this invention requires only the band-pass filters for pre-modulation and the low-pass filters having the same construction and characteristic, the latter being able to be substituted by transformers as mentioned. Therefore, this system can adopt the mass-product system of a few kinds which is very economical. The characteristic of this system consists in the complete interchangeability of every part, because, except the difference existing in the channel modulation carrier frequencies, all the parts have exactly the same construction, which is convenient at the time of maintenance and repairing of the apparatus.

I claim:

1. A multi-channel carrier communication system comprising a transmisson side having a plurality of channels in a selected transmission frequency band, and comprising premodulation means for uniformly converting the voice frequency signal components of all of the channels to the same high frequency of at least about six times the maximum frequency of the transmission frequency band, means for channel-modulating signal components by carrier frequencies which are different for each channel, means including low pass filters which are the same for all channels for selecting the lower side band components of said modulated signals and combining them so as to be allocated successively in the transmission frequency band in predetermined order; and a receiving side comprising means for performing functions of the transmission side in reverse order.

2. A system according to claim 1, further comprising band-pass filters between said pre-modulation means and channel-modulating means, the corresponding band-pass filters for all channels being the same.

3. A system according to claim 1, in which said filters include as elements transformers of channel-modulating means having characteristics suppressing frequencies outside the transmission frequency band.

4. A system according to claim 1, in which carrier frequencies applied to the channel-modulating means are selected so as to be higher than the pre-modulated signal frequency by the frequency equivalent to the transmission frequency band.

5. A system according to claim 1, further comprising a group band-pass filter for all channels, the input side of said group band-pass filter having the impedance characteristic with $\pi$ termination.

6. A system according to claim 1, further comprising in the frequency conversion stage of each channel, an amplifier having gain and output levels of minimum allowable values.

7. A systems according to claim 6, in which said amplifiers comprise input and output transformers used in common with transformers used before and after the amplifiers.

8. A system according to claim 1, in which said premodulation means comprises a plurality of successive premodulators.

9. A system according to claim 8, in which a pre-modulator in the low frequency region near the voice frequency signal has sharp cut-off characteristics at frequencies equivalent approximately to the upper and lower limits of the voice frequency signal and suppresses carrier frequency leakage.

10. A system according to claim 8, in which a modulator in the high frequency region has attention characteristics in the attentuation band.

11. A system according to claim 1, further comprising a carrier frequency power supply in which the frequency components corresponding to the carrier frequency of the channels in the transmission band are obtained from a stable oscillation power source and are modulated by the pre-modulation carrier frequency or its composite-frequencies to provide the required carrier frequency components for each channel modulation.

References Cited
UNITED STATES PATENTS

| | | | |
|---|---|---|---|
| 2,489,361 | 11/1949 | Bast | 179—15 |
| 2,522,846 | 9/1950 | Stewart | 179—15 |
| 2,794,854 | 6/1957 | Broughtwood | 343—200 |
| 3,084,328 | 4/1963 | Groenveld et al. | 325—50 |
| 3,089,920 | 5/1963 | Law | 179—15 |

JOHN W. CALDWELL, *Primary Examiner.*

ROBERT L. GRIFFIN, *Assistant Examiner.*